(12) United States Patent
Li et al.

(10) Patent No.: US 12,096,120 B2
(45) Date of Patent: Sep. 17, 2024

(54) PHOTOGRAPHING METHOD IN TELEPHOTO SCENARIO AND MOBILE TERMINAL

(71) Applicant: HONOR DEVICE CO., LTD., Guangdong (CN)

(72) Inventors: Guangyuan Li, Shenzhen (CN); Huanhuan Ao, Shenzhen (CN); Yuanwen Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 113 days.

(21) Appl. No.: 17/779,876

(22) PCT Filed: Oct. 28, 2020

(86) PCT No.: PCT/CN2020/124545
§ 371 (c)(1),
(2) Date: May 25, 2022

(87) PCT Pub. No.: WO2021/143269
PCT Pub. Date: Jul. 22, 2021

(65) Prior Publication Data
US 2022/0417416 A1 Dec. 29, 2022

(30) Foreign Application Priority Data
Jan. 14, 2020 (CN) .......................... 202010038444.X

(51) Int. Cl.
*H04N 23/67* (2023.01)
*H04N 23/60* (2023.01)
(Continued)

(52) U.S. Cl.
CPC ............ *H04N 23/67* (2023.01); *H04N 23/62* (2023.01); *H04N 23/631* (2023.01); *H04N 23/64* (2023.01)

(58) Field of Classification Search
CPC ...... H04N 23/67; H04N 23/62; H04N 23/631; H04N 23/64; H04N 23/61; H04N 23/632;
(Continued)

(56) References Cited

U.S. PATENT DOCUMENTS 11,375,120 B2   6/2022  Wang et al.
2010/0141826 A1*  6/2010  Thorn .................. H04N 23/631
                                                    348/E5.042
(Continued)

FOREIGN PATENT DOCUMENTS

CN         103871051 A  *  6/2014
CN         107948516 A     4/2018
(Continued)

OTHER PUBLICATIONS

English translation of CN 110572581 A provided by Google Patents. (Year: 2019).*
(Continued)

*Primary Examiner* — Twyler L Haskins
*Assistant Examiner* — John H Morehead, III
(74) *Attorney, Agent, or Firm* — Fish & Richardson P.C.

(57) ABSTRACT

A photographing method in a telephoto scenario and a mobile terminal are disclosed, which are related to the field of communications technologies, so as to improve sharpness of a photographed object in an image, blur a background, highlight the photographed object, and improve an overall visual effect of the image. The method specifically includes: in a telephoto photographing scenario, when a mobile terminal display a preview or photographed image, recognizing a target photographed object and a background of the target photographed object based on the image collected by a camera; and improving image sharpness of an area in which the target photographed object is located, and adding a
(Continued)

blurring effect to the image of the area in which the background of the target photographed object is located.

19 Claims, 19 Drawing Sheets

(51) Int. Cl.
*H04N 23/62* (2023.01)
*H04N 23/63* (2023.01)

(58) Field of Classification Search
CPC .. H04N 23/635; H04N 23/69; G06F 3/04845; G06F 3/04847
See application file for complete search history.

(56) References Cited

U.S. PATENT DOCUMENTS

| | | | |
|---|---|---|---|
| 2012/0063697 A1 | 3/2012 | Han et al. | |
| 2018/0098000 A1* | 4/2018 | Park | H04N 23/90 |
| 2019/0166288 A1* | 5/2019 | Ouyang | H04N 23/45 |
| 2023/0217097 A1* | 7/2023 | Wu | H04N 23/951 |
| | | | 348/208.1 |

FOREIGN PATENT DOCUMENTS

| | | | | |
|---|---|---|---|---|
| CN | 108307106 A | | 7/2018 | |
| CN | 108833768 A | | 11/2018 | |
| CN | 109951633 A | | 6/2019 | |
| CN | 110248081 A | | 9/2019 | |
| CN | 110445978 A | | 11/2019 | |
| CN | 110572581 A | * | 12/2019 | ......... H04N 5/23212 |
| EP | 3101889 A2 | | 12/2016 | |
| JP | 2009193193 A | | 8/2009 | |
| JP | 2009212899 A | | 9/2009 | |

OTHER PUBLICATIONS

English translation of CN 103871051 A provided by Google Patents (Year: 2014).*
Chen et al., "Automatic Synthetic Background Defocus for a Single Portrait Image," IEEE Transactions on Consumer Electronics, vol. 63, No. 3, Aug. 2017, 9 pages.
Yao et al., "Improving Long Range and High Magnification Face Recognition: Database Acquisition, Evaluation, and Enhancement," Computer Vision and Image Understanding, vol. 111, No. 2, Aug. 1, 2008, 15 pages.

* cited by examiner

PHOTOGRAPHING METHOD IN TELEPHOTO SCENARIO AND MOBILE TERMINAL

This application is a national stage of International Application No. PCT/CN2020/124545, filed on Oct. 28, 2020, which claims priority to Chinese Patent Application No. 202010038444.X, filed on Jan. 14, 2020. Both of the aforementioned applications are hereby incorporated by reference in their entireties.

TECHNICAL FIELD

This application relates to the field of mobile terminal technologies, and in particular, to a photographing method in a telephoto scenario and a mobile terminal.

BACKGROUND

Currently, a mobile phone can integrate a plurality of lenses, such as a wide-angle camera, a medium-focus cameras and a telephoto camera, to meet user requirements in different photographing scenarios. The telephoto camera can be used to photograph a photographed object far away from a user (that is, a telephoto photographing scenario). However, in an actual situation, because the photographed object is far away from the user, and specifications of the telephoto camera integrated on the mobile phone are also limited, sharpness of the photographed object in an image obtained in the telephoto photographing scenario is not high, and the photographed object is also highlighted, and a visual effect is not good.

SUMMARY

This application provides a photographing method in a telephoto scenario and a mobile terminal, which can improve sharpness of a photographed object in an image, blur a background, highlight the photographed object, and improve an overall visual effect of the image.

To achieve the foregoing objective, embodiments of this application provide the following technical solutions:

According to a first aspect, a photographing method in a telephoto scenario is provided, and applied to a mobile terminal including a camera. The method includes: The mobile terminal starts the camera, and the mobile terminal displays a finder frame, where the finder frame is used to display a first preview picture, and a zoom ratio of the camera corresponding to the first preview picture is a first magnification; receiving a first operation input by a user to increase the zoom ratio of the camera; the finder frame displays a second preview picture in response to the first operation, where a zoom ratio of the camera corresponding to the second preview picture is a second magnification, and the second magnification is greater than the first magnification; and if the second magnification is greater than or equal to a preset magnification, before the mobile terminal displays the second preview picture, the mobile terminal performs first image processing on an image collected by the camera to generate the second preview picture, where the first image processing includes: recognizing a target photographed object and a background of the target photographed object based on the image collected by the camera; and improving image sharpness of an area in which the target photographed object is located, and adding a blurring effect to the image of the area in which the background of the target photographed object is located.

In a telephoto photographing scenario, because a photographed object is far away from the mobile phone, the sharpness of an original image collected by the mobile phone camera is not high. Therefore, an embodiment of this application provides a photographing method in a telephoto photographing scenario, so as to intelligently recognize a target photographed object, perform detail enhancement on the target photographed object, and improve the sharpness of a partial image of the photographed object in collected original image. The method can be further used to automatically recognize a foreground and a background of the image based on the recognized photographed object, blur the background outside the photographed object, highlight the target photographed object, enhance the artistic sense of the image in the telephoto photographing scenario, and enhance visual experience of the user.

In a possible implementation, the method further includes: displaying, by the mobile terminal, a marker box on the second preview picture to mark the area in which the target photographed object is located.

Therefore, the user can further determine, based on the marker box, whether the target photographed object automatically recognized by the mobile terminal is a to-be-photographed object, whether the target photographed object automatically identified is complete, and the like.

In a possible implementation, the method further includes: displaying, by the mobile terminal, prompt information on the second preview picture to recommend the first image processing corresponding to the target photographed object.

In a possible implementation, the performing, by the mobile terminal, first image processing on an image collected by the camera includes: receiving, by the mobile terminal, a second operation input by the user to select the first image processing; and in response to the second operation, performing, by the mobile terminal, the first image processing on the image collected by the camera.

In a possible implementation, adjusting a position of the target photographed object in the second preview picture specifically includes: adjusting the second preview picture, so that the target photographed object is located in a central area of the second preview picture.

In a specific implementation, based on the position of the recognized photographed object in the image, the background of the photographed object in the image can be cut or filled, so that the photographed object is located at a central position of the image. Alternatively, the photographed object may be located at another position of the image, for example, a position that is on the left or right of the central position by a certain distance. This is not limited in this embodiment of this application.

In a possible implementation, after the mobile terminal displays the second preview picture, the method further includes: receiving a third operation input by the user, where the third operation is used to instruct the mobile terminal to turn off the first image processing function corresponding to the target photographed object; and in response to the third operation, the mobile terminal determines that no first image processing is performed on the image collected by the camera.

Therefore, a method for turning off the first image processing is provided, to meet different use requirements of users.

In a possible implementation, in the first image processing, the improving image sharpness of an area in which the target photographed object is located specifically includes: recognizing a category of the target photographed object, and obtaining a first image of the target photographed object by segmenting the image collected by the camera; and inputting the first image into a neural network model corresponding to the category of the target photographed object, and outputting a second image of the target photographed object, where the sharpness of the second image is greater than that of the first image.

In a possible implementation, the neural network model corresponding to the category of the target photographed object is trained based on images of a plurality of photographed objects under the category of the target photographed object.

It may be understood that the mobile phone can pre-train an AI model for detail enhancement on the photographed objects based on the category of the photographed object. Certainly, the mobile phone can alternatively directly obtain the trained AI model from a server. It should be noted that, when the AI model for detail enhancement on the photographed objects based on the category of the photographed object is trained, it is necessary to input a large quantity of training samples of the photographed object, including training samples of various categories. For example, training samples for magpies in birds include images of magpies of different breeds, images of magpies of the same breed with different sizes or colors, images of magpies of the same breed with different postures, and images of magpies of the same breed in different environments. Detail enhancement on photographed objects may include using the AI model for intelligent pixel filling and the like of blurred areas in the photographed objects to enhance image sharpness. The detail enhancement further includes: using the AI model for intelligent pixel filling and the like of missing parts of the photographed objects to repair the missing parts of the photographed objects and the like. The detail enhancement may further include: improving overall sharpness of a partial image of the photographed object and the like.

In a possible implementation, in the first image processing, the recognizing a background of the target photographed object specifically includes: recognizing, by using a background extraction algorithm, the background of the target photographed object from the image collected by the camera, where the background extraction algorithm includes any one or random several of an inter-frame difference method, a background difference method and an environment algorithm.

In a possible implementation, the first image processing further includes: automatically focusing based on the target photographed object when the camera collects an image containing the target photographed object.

It may be noted that in the prior art, focusing and exposure are usually performed based on a fixed position, or based on a position selected by the user (for example, a touch position of a click operation). However, in this embodiment of this application, focusing and exposure are performed based on the position of the target photographed object automatically recognized by the mobile phone, so as to improve overall sharpness of the target photographed object.

It may be further noted that in the prior art, the size of a focus frame is fixed, and is usually set by default in the mobile phone. However, in this embodiment of this application, during the auto-focusing process based on the target photographed object, the size of the focus frame is automatically adjusted based on the size of the target photographed object recognized by the mobile terminal. In some examples, the focus frame may be the same as the marker box.

Optionally, because the method according to this embodiment of this application is applied to a telephoto photographing scenario, the closest search distance during auto-focusing of the mobile terminal may be set to, for example, 10 meters. That is, when the mobile terminal is auto-focused, the search distance range is 10 meters from the mobile terminal to infinity. In other words, the mobile terminal does not need to search in the range of 10 meters to a macro distance from the mobile terminal. Therefore, the time for auto-focusing of the mobile terminal can be reduced, and efficiency of image processing is improved.

In a possible implementation, the first image processing further includes: controlling the camera to continuously collect N images containing the target photographed object, and using a super-sharpness technology to synthesize the N images containing the target photographed object into a third image; and improving image sharpness of an area in which the target photographed object is located based on the third image, and adding a blurring effect to the image of the area in which the background of the target photographed object is located. Therefore, the target photographed object in the image is further highlighted, and the overall artistic sense of the image is improved.

In a possible implementation, in the first image processing, the adding a blurring effect to the image of the area in which the background of the target photographed object is located specifically includes: using a fuzzy algorithm to process the image of the area in which the background of the target photographed object is located, where the fuzzy algorithm includes any one or random several of Gaussian filtering, circular filtering, guided filtering and domain filtering.

According to a second aspect, a mobile terminal is provided, including: a processor, a memory and a touch screen, where the memory and the touch screen are coupled to the processor, the memory is configured to store computer program code, the computer program code includes a computer instruction, and when the processor reads the computer instruction from the memory, the mobile terminal is enabled to perform the method in the foregoing aspects and any one of the possible implementations.

According to a third aspect, an apparatus is provided. The apparatus is included in a mobile terminal and has a function of implementing behavior of the mobile terminal in any method in the foregoing aspects and possible implementations. This function may be implemented by hardware, or by hardware executing corresponding software. The hardware or software includes at least one module or unit corresponding to the foregoing function. For example, the at least one module or unit is a receiving module or unit, a display module or unit and a processing module or unit.

According to a fourth aspect, a chip system is provided, including a processor, where when the processor executes instructions, the processor performs the method in the foregoing aspects and any one of the possible implementations.

According to a fifth aspect, a computer readable storage medium is provided, including a computer instruction, where when the computer instruction is run on a mobile terminal, the mobile terminal is enabled to perform the method in the foregoing aspects and any one of the possible implementations.

According to a sixth aspect, a computer program product is provided, where when the computer program product runs on a computer, the computer is enabled to performed the method in the foregoing aspects and any one of the possible implementations.

DESCRIPTION OF EMBODIMENTS

In embodiments of this application, the words such as "example" or "for example" are used to indicate provision of examples, illustrations or descriptions. Any embodiment or design scheme described as "example" or "for example" in the embodiments of this application should not be interpreted as being more preferred or advantageous than other embodiments or design schemes. Precisely, words such as "example" or "for example" are used to present related concepts in a specific manner.

The terms "first" and "second" are used herein for description only, and cannot be understood as indicating or implying relative importance or implicitly indicating the quantity of indicated technical features. Therefore, the features defined with "first" and "second" can explicitly or implicitly include one or more of the features. In the description of the embodiments of this application, unless otherwise specified, "a plurality of" means two or more.

A photographing method according to this embodiment of this application can be applied to a mobile terminal provided with a camera. The mobile terminal may be, for example, a mobile phone, a tablet computer, a personal computer (personal computer, PC), a personal digital assistant (personal digital assistant, PDA), a smartwatch, a netbook, a wearable electronic device, an augmented reality (augmented reality, AR) device, a virtual reality (virtual reality, VR) device, an in-vehicle device, an intelligent vehicle, an intelligent speaker, and a robot. No special limitations are imposed on a specific form of the mobile terminal in this application.

Figure 1:
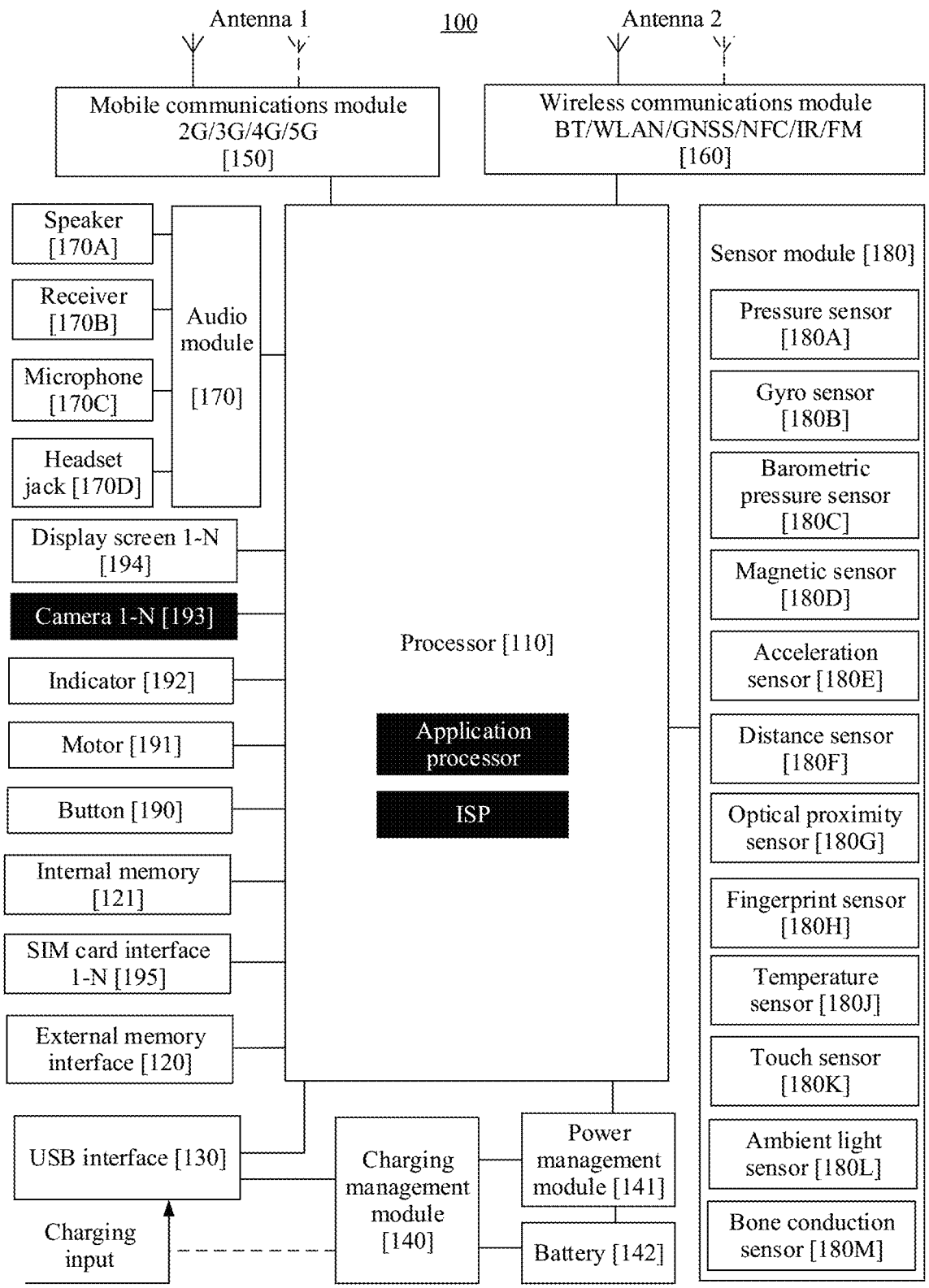
FIG. 1 is a first schematic structural diagram of a mobile terminal according to an embodiment of this application.

FIG. 1 illustrates a schematic structural diagram of a mobile terminal 100. The mobile terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the mobile device 100. In some other embodiments of this application, the mobile device 100 may include more or fewer components than those shown in the figure, combine some components, split some components, or have a different component arrangement. The components shown may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on an instruction operation code and a time sequence signal, so as to control instruction retrieval and instruction execution.

A memory may be further disposed in the processor 110 to store an instruction and data. In some embodiments, the memory in the processor 110 is a cache memory. The memory can store an instruction or data that the processor 110 has just used or used cyclically. If the processor 110 needs to use the instruction or data again, the instruction or data can be directly invoked from the memory. Repeated access is avoided, and a waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, and includes a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash, the camera 193 and the like by using different I2C bus interfaces. For example, the processor 110 may be coupled to the touch sensor 180K by using an I2C interface, so that the processor 110 communicates with the touch sensor 180K by using the I2C bus interface, thereby implementing a touch function of the mobile terminal 100.

The I2S interface can be used for audio communication. In some embodiments, the processor 110 may include a plurality of groups of I2S buses. The processor 110 may be coupled to the audio module 170 by using the I2S bus to implement communication between the processor 110 and the audio module 170. In some embodiments, the audio module 170 can transmit an audio signal to the wireless communications module 160 by using the I2S interface, so as to implement a function of answering calls by using a Bluetooth headset.

The PCM interface can also be used for audio communication to sample, quantize and encode analog signals. In some embodiments, the audio module 170 may be coupled to the wireless communications module 160 by using a PCM bus interface. In some embodiments, the audio module 170 can also transmit an audio signal to the wireless communications module 160 by using the PCM interface, so as to implement a function of answering calls by using a Bluetooth headset. Both the I2S interface and the PCM interface can be used for audio communication.

The UART interface is a universal serial data bus used for asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 by using the UART interface to implement a Bluetooth function. In some embodiments, the audio module 170 can transmit an audio signal to the wireless communications module 160 by using the UART interface, so as to implement a function of playing music by using a Bluetooth headset.

The MIPI interface may be configured to connect the processor 110 to the display screen 194, the camera 193 and other peripheral devices. The MIPI interface includes a camera serial interface (camera serial interface, CSI), a display serial interface (display serial interface, DSI), and the like. In some embodiments, the processor 110 and the camera 193 communicate by using the CSI to implement a photographing function of the mobile terminal 100. The processor 110 and the display screen 194 communicate by using the DSI to implement a display function of the mobile terminal 100.

The GPIO interface may be configured by using software. The GPIO interface may be configured as a control signal interface, or may be configured as a data signal interface. In some embodiments, the GPIO interface may be configured to connect the processor 110 to the camera 193, the display screen 194, the wireless communications module 160, the audio module 170, the sensor module 180, and the like. The GPIO interface may be alternatively configured as an I2C interface, an I2S interface, a UART interface, an MIPI interface, or the like.

The USB interface 130 is an interface that complies with USB standard specifications, and may be specifically a Mini USB interface, a Micro USB interface, a USB Type C interface, or the like. The USB interface 130 may be configured to connect a charger to charge the mobile terminal 100, or may be configured to transmit data between the mobile terminal 100 and a peripheral device. The USB interface 130 may alternatively be configured to connect a headset and play audio by using the headset. The interface may be further configured to connect other mobile terminals, such as an AR device.

It may be understood that the interface connection relationship between the modules illustrated in this embodiment of the present invention is merely an example for description, and does not constitute a limitation on the structure of the mobile terminal 100. In some other embodiments of this application, the mobile terminal 100 may alternatively use an interface connection mode that is different from those in the foregoing embodiments, or use a combination of a plurality of interface connection modes.

The charging management module 140 is configured to receive a charging input from the charger. The charger may be a wireless charger, or may be a wired charger. In some embodiments of wired charging, the charging management module 140 can receive a charging input of the wired charger through the USB interface 130. In some embodiments of wireless charging, the charging management module 140 can receive a wireless charging input through a wireless charging coil of the mobile terminal 100. When charging the battery 142, the charging management module 140 can also supply power to the mobile terminal through the power management module 141 at the same time.

The power management module 141 is configured to connect the battery 142, the charging management module 140, and the processor 110. The power management module 141 receives an input from the battery 142 and/or the charging management module 140, and supplies power to the processor 110, the internal memory 121, the display screen 194, the camera 193, the wireless communications module 160, and the like. The power management module 141 may be further configured to monitor parameters such as a battery capacity, battery recycling times, and a battery health status (leakage and impedance). In some other embodiments, the power management module 141 may alternatively be disposed in the processor 110. In some other embodiments, the power management module 141 and the charging management module 140 may alternatively be disposed in the same device.

The wireless communication function of the mobile terminal 100 can be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile terminal 100 may be configured to cover one or more communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 can provide a wireless communication solution including 2G/3G/4G/5G and the like applied to the mobile terminal 100. The mobile communications module 150 may include at least one filter, a switch, a power amplifier, a low noise amplifier (low noise amplifier, LNA), and the like. The mobile communications module 150 can receive an electromagnetic wave through the antenna 1, perform processing such as filtering and amplifying on the received electromagnetic wave, and transmit the processed electromagnetic wave to the modem processor for demodulation. The mobile communications module 150 can further amplify a signal that is modulated by the modem processor, and the signal is converted into an electromagnetic wave and radiated by the antenna 1. In some embodiments, at least some functional modules of the mobile communications module 150 may be disposed in the processor 110. In some embodiments, at least some functional modules of the mobile communications module 150 and at least some modules of the processor 110 may be disposed in the same device.

The modem processor may include a modulator and a demodulator. The modulator is configured to modulate a to-be-sent low frequency baseband signal into a medium-high frequency signal. The demodulator is configured to demodulate a received electromagnetic wave signal into a low frequency baseband signal. Then the demodulator transmits the demodulated low frequency baseband signal to a baseband processor for processing. After the low frequency baseband signal is processed by the baseband processor, the processed low frequency baseband signal is transmitted to an application processor. The application processor outputs a sound signal by using an audio device (not limited to the speaker 170A, the receiver 170B, and the like), or displays an image or video by using the display screen 194. In some embodiments, the modem processor may be an independent device. In some other embodiments, the modem processor may be independent of the processor 110 and be disposed in the same device as the mobile communications module 150 or other functional modules.

The wireless communications module 160 may provide a wireless communication solution that is applied to the mobile terminal 100, including wireless local area network (wireless local area network, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), infrared (infrared, IR), and the like. The wireless communications module 160 may be one or more devices integrating at least one communication processing module. The wireless communications module 160 receives an electromagnetic wave through the antenna 2, performs processing of frequency modulation and filtering on the electromagnetic wave signal, and sends the processed signal to the processor 110. The wireless communications module 160 can further receive a to-be-sent signal from the processor 110, and perform frequency modulation and amplification on the signal. The signal is converted into an electromagnetic wave and radiated by the antenna 2.

In some embodiments, the antenna 1 of the mobile terminal 100 is coupled to the mobile communications module 150, and the antenna 2 is coupled to the wireless communications module 160, so that the mobile terminal 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The mobile terminal 100 implements a display function by using the GPU, the display screen 194, the application processor, and the like. The GPU is an image processing microprocessor, which is connected to the display screen 194 and the application processor. The GPU is configured to perform mathematical and geometric calculations to render graphics. The processor 110 may include one or more GPUs that execute program instructions to generate or change display information.

The display screen 194 is configured to display an image, a video, and the like. The display screen 194 includes a display panel. The display panel may be a liquid crystal display (liquid crystal display, LCD), an organic light emitting diode (organic light-emitting diode, OLED), an active matrix organic light emitting diode (active-matrix organic light emitting diode, AMOLED), a flex light emitting diode (flex light-emitting diode, FLED), a Miniled, a MicroLed, a Micro-oLed, quantum dot light emitting diodes (quantum dot light emitting diodes, QLED), or the like. In some embodiments, the mobile terminal 100 may include 1 or N display screens 194, where N is a positive integer greater than 1.

The mobile terminal 100 can implement a photographing function by using the ISP, the camera 193, the video codec, the GPU, the display screen 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transfers the electrical signal to the ISP for processing, so that the electrical signal is converted into an image visible to a naked eye. The ISP can further optimize algorithms for noise, brightness, and a skin color of the image. The ISP can further optimize parameters such as exposure and color temperature of the photographing scene. In some embodiments, the ISP may be disposed in the camera 193.

The camera 193 is configured to capture a still image or a video. An optical image is generated for an object through the lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into an image signal in a standard format of RGB, YUV, or the like. In some embodiments, the mobile terminal 100 may include 1 or N cameras 193, where N is a positive integer greater than 1.

In some embodiments of this application, the 1 or N cameras 193 may include at least one telephoto camera, which may be configured to capture a photographed object far away from the mobile terminal 100. The processor 110 (for example, it may specifically be one or more of an ISP, a CPU, a DSP and an NPU) can perform detail enhancement and background blurring processing on the image collected by the telephoto camera, improve image quality in a telephoto photographing scenario of the mobile terminal, and improve the user's visual experience.

The digital signal processor is configured to process a digital signal. In addition to processing a digital image signal, the digital signal processor can further process another digital signal. For example, when the mobile terminal 100 selects a frequency, the digital signal processor is configured to perform Fourier transform or the like on energy of the frequency.

The video codec is configured to compress or decompress a digital video. The mobile terminal 100 can support one or more video codecs. In this way, the mobile terminal 100 can play or record videos in a plurality of encoding formats, such as moving picture experts group (moving picture experts group, MPEG)-1, MPEG-2, MPEG-3, and MPEG-4.

The NPU is a neural-network (neural-network, NN) computing processor. By referring to a structure of a biological neural network, such as a transfer mode between human brain neurons, the NPU quickly processes input information, and can further perform continuous self-learning. The NPU can implement applications such as intelligent cognition of the mobile terminal 100, for example, image recognition, face recognition, voice recognition, and text understanding.

The external memory interface 120 may be configured to connect an external storage card such as a Micro SD card, to expand a storage capacity of the mobile terminal 100. The external storage card communicates with the processor 110 through the external memory interface 120 to implement a data storage function. For example, music, video, and other files are stored in the external storage card.

The internal memory 121 may be configured to store computer executable program code, where the executable program code includes an instruction. The internal memory 121 may include a program storage area and a data storage area. The program storage area may store an operating system, an application program required by at least one function (for example, a sound play function or an image play function), or the like. The data storage area may store data (such as audio data or a phone book) created during use of the mobile terminal 100. In addition, the internal memory 121 may include a high-speed random access memory, and may further include a non-volatile memory, such as at least one magnetic disk storage device, a flash memory device, or a universal flash storage (universal flash storage, UFS). By running the instruction stored in the internal memory 121, and/or the instruction stored in the memory disposed in the processor, the processor 110 executes various function applications and data processing of the mobile terminal 100.

The mobile terminal 100 can implement the audio functions such as music playing and sound recording by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode audio signals. In some embodiments, the audio module 170 may be arranged in the processor 110, or some of the functional modules of the audio module 170 may be arranged in the processor 110.

The speaker 170A is configured to convert an audio electrical signal into a sound signal. The mobile terminal 100 can listen to music by using the speaker 170A, or listen to a hands-free call.

The receiver 170B is configured to convert an audio electrical signal into a sound signal. When the mobile terminal 100 receives a call or voice message, the receiver 170B can be placed close to an ear to receive the voice.

The microphone 170C, also referred to as a "loudspeaker", is configured to convert a sound signal into an electrical signal. When making a call or sending a voice message, the user can make the mouth approach the microphone 170C and emit a sound, so as to input a sound signal into the microphone 170C. The mobile terminal 100 may be provided with at least one microphone 170C. In some other embodiments, the mobile terminal 100 may be provided with two microphones 170C, which can implement noise reduction function in addition to collecting sound signals. In some other embodiments, the mobile terminal 100 may alternatively be provided with three, four, or more microphones 170C to implement sound signal collection, noise reduction, sound source recognition, directional recording, and the like functions.

The headset jack 170D is configured to connect a wired headset. The headset jack 170D may be a USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The button 190 includes a power-on button, a volume button, or the like. The button 190 may be a mechanical button, or may be a touch button. The mobile terminal 100 can receive a key input, and generate a key signal input related to user setting and function control of the mobile terminal 100.

The motor 191 can generate a vibrating alert. The motor 191 may be configured to provide a vibration alert on an incoming call, or may be configured to provide touch vibration feedback. For example, touch operations that act on different applications (such as photographing and audio playback) can correspond to different vibration feedback effects. In response to touch operations that act on different areas of the display screen 194, the motor 191 can also correspond to different vibration feedback effects. Different application scenarios (such as time reminding, receiving information, alarm clock and games) can also correspond to different vibration feedback effects. Touch vibration feedback effects can also support customization.

The indicator 192 may be an indicator light, which may be configured to indicate a charging state and a power change, or to indicate a message, a missed call, a notification, or the like.

The SIM card interface 195 is configured to connect an SIM card. An SIM card can be inserted into the SIM card interface 195 or pulled out from the SIM card interface 195 to implement contact with or separation from the mobile terminal 100. The mobile terminal 100 may support 1 or N SIM card interfaces, where N is a positive integer greater than 1. The SIM card interface 195 can support a Nano SIM card, a Micro SIM card, an SIM card, and the like. The same SIM card interface 195 allows a plurality of cards to be inserted simultaneously. The plurality of cards may be of the same type or different types. The SIM card interface 195 can also be compatible with different types of SIM cards. The SIM card interface 195 can also be compatible with an external storage card. The mobile terminal 100 interacts with the network by using the SIM card to implement functions such as call and data communication. In some embodiments, the mobile terminal 100 uses an eSIM, that is, an embedded SIM card. The eSIM card can be embedded in the mobile terminal 100 and cannot be separated from the mobile terminal 100.

A software system of the mobile terminal 100 may use a layered architecture, an event-driven architecture, a micro-core architecture, a micro-service architecture, or a cloud architecture. The embodiment of the present invention takes an Android system with a layered architecture as an example to exemplify the software structure of the mobile terminal 100.

Figure 2:
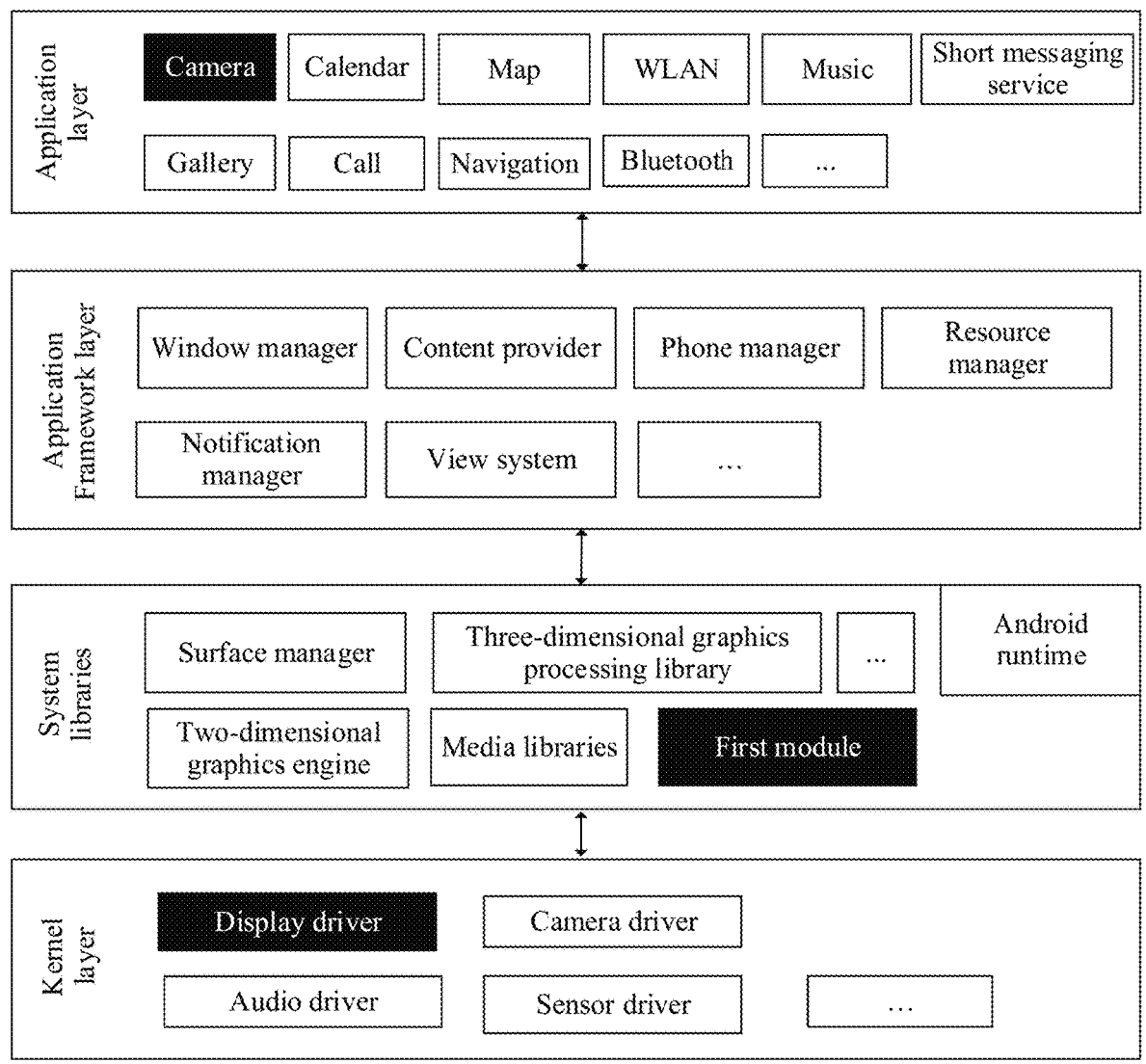
FIG. 2 is a second schematic structural diagram of a mobile terminal according to an embodiment of this application.

FIG. 2 is a block diagram of a software structure of a mobile terminal 100 according to an embodiment of this application.

The layered architecture divides software into several layers, and each layer has a clear role and division of labor. The layers communicate with each other through software interfaces. In some embodiments, the Android system is divided into four layers: an application layer, an application framework layer, Android runtime (Android runtime) and system libraries, and a kernel layer from the top down.

As shown in FIG. 2, the application layer may include a series of application packages, including applications preset before the mobile terminal leaves the factory, or applications installed by the user by using, for example, an application market or other methods after the mobile terminal leaves the factory. These applications include, but are not limited to, applications such as a camera, a gallery, a calendar, a call, a map, a navigation, a WLAN, Bluetooth, music, video, short messaging service, a browser, WeChat, Taobao, and Alipay (only some of them are shown in the figure).

The application framework layer provides an application programming interface (application programming interface, API) and a programming framework for applications at the application layer. The application framework layer includes some predefined functions.

As shown in FIG. 2, the application framework layer may include a window manager, a content provider, a view system, a phone manager, a resource manager, a notification manager, and the like. The window manager is configured to manage window programs. The window manager can obtain the size of the display screen, determine whether there is a status bar, lock the screen, take a screenshot, and the like. The content provider is configured to store and obtain data, and enables these data to be accessible to an application. The data may include videos, images, audio, calls made and received, browsing history and bookmarks, phone books, and the like. The view system includes visual controls, such as a control for displaying text and a control for displaying pictures. The view system may be configured to build an application. A display interface may include one or more views. For example, a display interface that includes a short messaging service notification icon may include a view for displaying text and a view for displaying pictures. The phone manager is configured to provide a communication function of the mobile terminal 100, such as call state management (including connecting, hanging up, or the like). The resource manager provides resources for applications, such as localized strings, icons, images, layout files, and video files. The notification manager enables an application to display notification information in the status bar, which can be used to convey a notification-type message, and can automatically disappear after a short stay without user interaction. For example, the notification manager is used for notifying download completion or as a message reminder. The notification manager may alternatively be a notification that appears in the status bar at the top of the system in the form of a chart or scroll bar text, such as a notification for an application running in the background, or a notification that appear on the screen in the form of a dialog window. For example, a text information prompt is provided in the status bar, a prompt tone is issued, the mobile terminal vibrates, and an indicator light flashes.

The Android runtime includes a core library and a virtual machine. The Android runtime is responsible for scheduling and management of the Android system.

The core library includes two parts: one part is function functions that the java language needs to invoke, and the other part is the core library of Android.

The application layer and the application framework layer run in a virtual machine. The virtual machine executes java files at the application layer and the application framework layer as binary files. The virtual machine is configured to implement functions such as object lifecycle management, stack management, thread management, security and exception management, and recycling of waste.

A system library may include a plurality of functional modules, such as a surface manager (surface manager), media libraries (Media Libraries), three-dimensional graphics processing library (for example, OpenGL ES), and a 2D graphics engine (for example, SGL).

The surface manager is configured to manage a display subsystem, and provide fusion of 2D and 3D layers for multiple applications.

The media libraries support multiple common audio and video formats for playback and recording, as well as static image files. The media libraries may support a variety of audio and video encoding formats, such as MPEG4, H.264, MP3, AAC, AMR, JPG, and PNG.

The three-dimensional graphics processing library is configured to achieve three-dimensional graphics drawing, image rendering, compositing, and layer processing.

The 2D graphics engine is a graphics engine for 2D graphics.

In some embodiments of this application, the system library may also include a first module, which may be configured to perform detail enhancement and background blurring processing on the image collected by the telephoto camera in the mobile terminal 100, improve image quality in a telephoto photographing scenario of the mobile terminal, and improve the user's visual experience.

The kernel layer is a layer between hardware and software. The kernel layer includes at least a display driver, a camera driver, an audio driver, and a sensor driver.

A workflow of the software and hardware of the mobile terminal 100 is exemplified below with reference to a capturing photographing scenario.

When the touch sensor 180K receives a touch operation, corresponding hardware interrupt is sent to the kernel layer. The kernel layer processes the touch operation into an original input event (including touch coordinates, a timestamp of the touch operation and other information). The original input event is stored in the kernel layer. The application framework layer obtains the original input event from the kernel layer and recognizes a control corresponding to the input event. In an example in which the touch operation is a touch click operation, and the control corresponding to the click operation is a control of a camera application icon, the camera application invokes the interface of the application framework layer to start the camera application, and then starts the camera driver by invoking the kernel layer. The camera 193 captures a still image or video.

The technical solutions in the following embodiments can all be implemented in the mobile terminal 100 having the foregoing hardware architecture and software architecture.

Here, using a mobile phone as an example of the mobile terminal 100, the technical solutions according to the embodiments of this application are described in detail with reference to the accompanying drawings.

For example, the user can instruct the mobile phone to start the camera application by using methods such as touching a specific control on a mobile phone screen, pressing a specific physical button or button combination, inputting voice, or making gestures in the air. In response to receiving the user's instruction to start the camera, the mobile phone starts the camera and displays a photographing interface.

Figure 3:
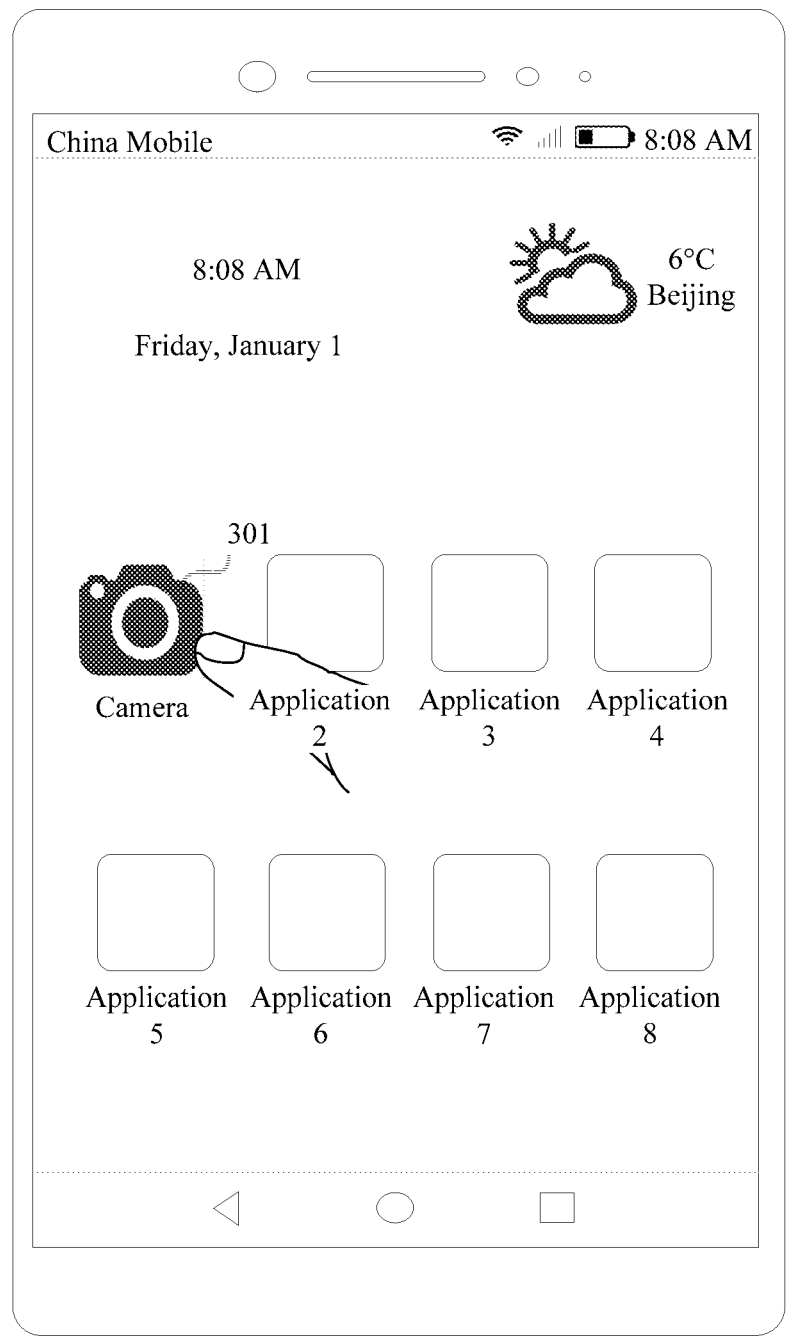
FIG. 3(1) to FIG. 3(4) are schematic diagrams of user interfaces of some mobile terminals according to an embodiment of this application.
Figure 3:
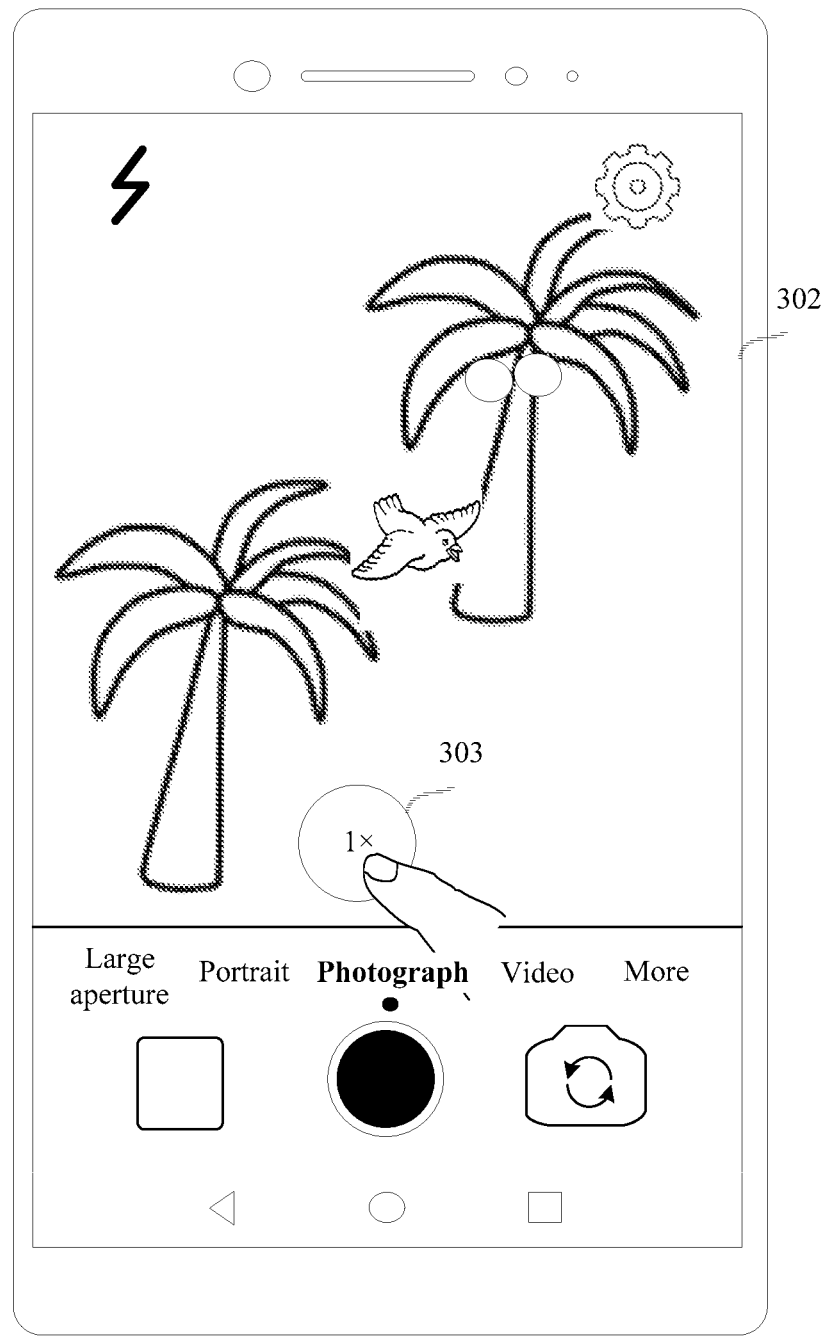
Figure 3:
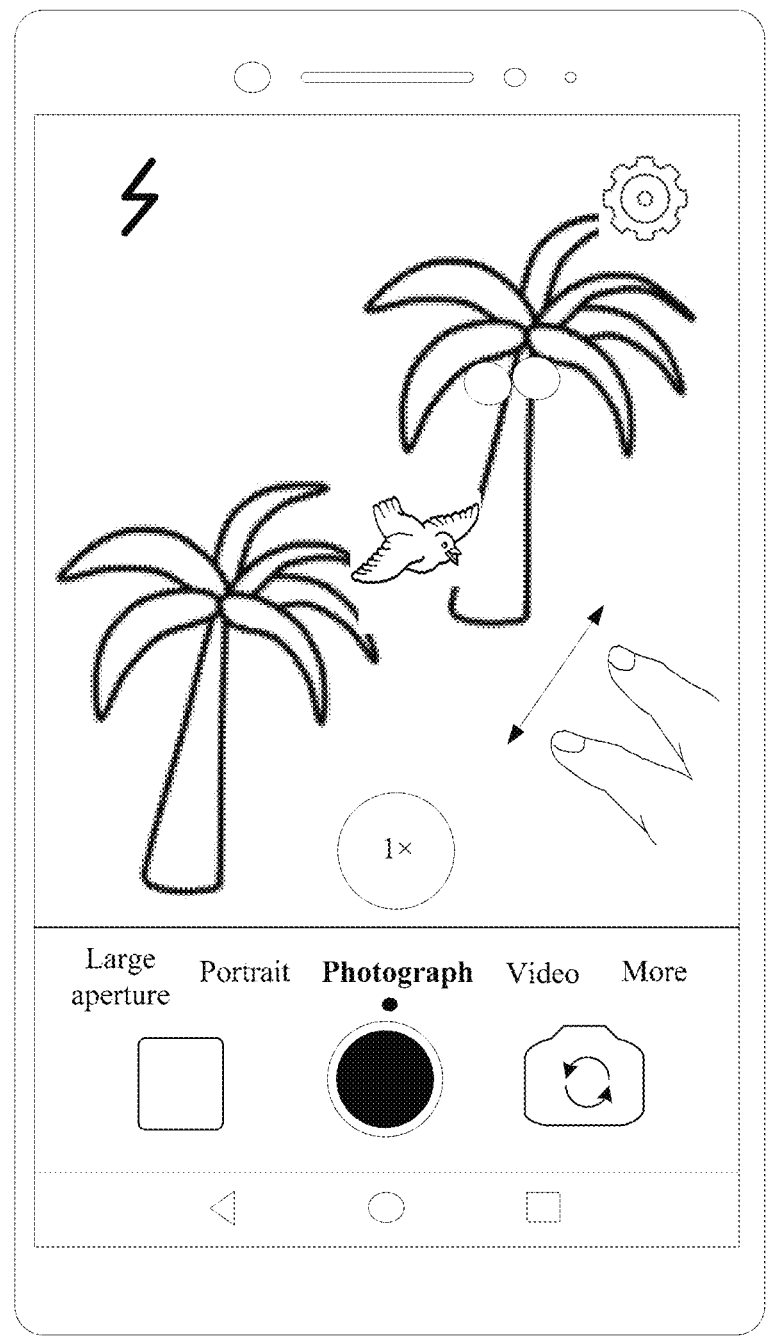
Figure 3:
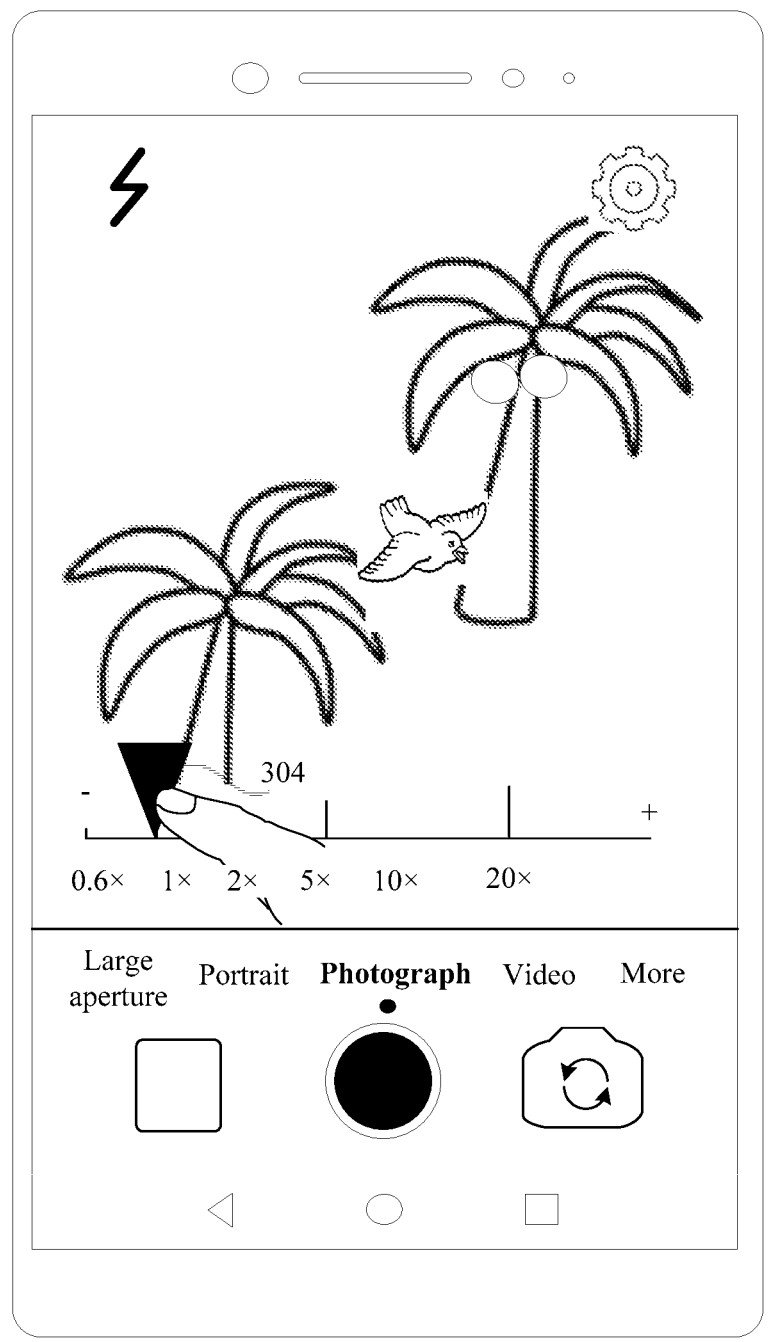

For example, as shown in FIG. 3(1), the user can click a "camera" application icon 301 on a mobile phone desktop to instruct the mobile phone to start the camera application, and the mobile phone displays the photographing interface shown in FIG. 3(2).

For another example, when the mobile phone is in a locked screen state, the user can also instruct the mobile phone to open the camera application by sliding to the right on the mobile phone screen, and the mobile phone can also display the photographing interface as shown in FIG. 3(2).

Alternatively, when the mobile phone is in the locked screen state, the user can click the shortcut icon of the "camera" application on the lock screen to instruct the mobile phone to open the camera application, and the mobile phone can also display the photographing interface shown in FIG. 3(2).

For another example, when another application runs on the mobile phone, the user can also click a corresponding control to enable the mobile phone to start the camera application for photographing. For example, when the user is using an instant messaging application (such as a WeChat application), the user can also select the control of the camera function to instruct the mobile phone to open the camera application for photographing and video shooting.

As shown in FIG. 3(2), the camera's photographing interface generally includes a finder frame 302, a photographing control and other functional controls ("large aperture", "portrait", "photograph", "video", and the like). The finder frame 302 may be configured to preview an image (or picture) collected by the camera, and the user can determine a time for instructing the mobile phone to perform a photographing operation based on the image (or picture) in the finder frame 302. The operation that the user instructs the mobile phone to perform the photographing operation may be, for example, an operation that the user clicks the photographing control, or an operation that the user presses the volume button. In some embodiments, the photographing interface may further include a zoom ratio indicator 303. The default zoom ratio of the mobile phone is usually a basic magnification, which is "1×".

The mobile phone that integrates three cameras, a short-focus (wide-angle) camera, a medium-focus camera and a telephoto camera, is used as an example for description. Usually, the user uses the medium-focus camera the most in scenarios, so that the medium-focus camera is usually set as a main camera. The focal length of the main camera is set as a reference focal length, and the zoom ratio is "1×". In some embodiments, the image captured by the main camera may be digitally zoomed (digital zoom), that is, each pixel area of the "1×" image captured by the main camera is enlarged by the ISP or another processor in the mobile phone, and the framing range of the image is correspondingly reduced, so that the processed image is equivalent to the image captured by the main camera at other zoom ratio (for example, "2×"). That is, the image photographed by the main camera may correspond to the zoom ratio within a range, for example, "1×" to "5×".

Similarly, a multiple of the focal length of the telephoto camera and the focal length of the main camera can be used as the zoom ratio of the telephoto camera. For example, the focal length of the telephoto camera may be 5 times the focal length of the main camera, that is, the zoom ratio of the telephoto camera is "5×". Likewise, the image captured by the telephoto camera can also be digitally zoomed. That is, the image photographed by the telephoto camera may correspond to the zoom ratio within another range, for example, "5×" to "50×".

Similarly, a multiple of the focal length of the short-focus (wide-angle) camera and the focal length of the main camera can be used as the zoom ratio of the short-focus (wide-angle) camera. For example, the focal length of the short-focus camera may be 0.5 times the focal length of the main camera, that is, the zoom ratio of the telephoto camera is "0.5×". Likewise, the image captured by the short-focus (wide-angle) camera can also be digitally zoomed. That is, the image photographed by the telephoto camera may correspond to the zoom ratio within another range, for example, "0.5×" to "1×".

In an actual photographing scenario, the short-focus (wide-angle) camera and the medium-focus camera are mostly used to photograph a photographed object that is closer to the mobile phone. The telephoto camera is usually configured to photograph a photographed object far away from the mobile phone. Certainly, in some scenarios, a high zoom ratio of the medium-focus camera may alternatively be used to photograph a photographed object that is far from the mobile phone. The telephoto photographing scenario in this embodiment of this application may be understood as a photographing scenario where the zoom ratio of the mobile phone is greater than a preset magnification (for example, "5×", "10×" and "20×"). In a telephoto photographing scenario, the mobile phone may use an image photographed by the medium-focus camera or an image photographed by the telephoto camera, which is not specifically limited in this embodiment of this application.

It should be noted that, in a telephoto photographing scenario, because a photographed object is far away from the mobile phone, the sharpness of an original image collected by the mobile phone camera is not high. In addition, when the photographed object is far away from the mobile phone and the mobile phone uses telephoto for photographing at a high magnification, because the depth of field of the image is extremely small, the mobile phone cannot achieve the photographing effect of blurred background by means of a large aperture and the like. Therefore, an embodiment of this application provide a photographing method in a telephoto photographing scenario, which can process an original image collected by a mobile phone camera. Specifically, a photographed object is intelligently recognized, detail enhancement is performed on the photographed object, and the sharpness of a partial image of the photographed object in the original image is improved. The method can be further used to automatically recognize a foreground and a background of the images based on the recognized photographed objects, blur the background outside the photographed objects, enhance the artistic sense of the images in the telephoto photographing scenario, and enhance visual experience of the user.

Sharpness refers to clarity of texture details and boundaries of each part of the image. For example, an image 1 is the original image collected by the mobile phone camera. If the method according to this embodiment of this application is adopted, the image 1 is processed to obtain an image 2. The sharpness of the photographed object in the image 2 is higher than that of the photographed object in the image 1. If the image 1 and the image 2 are enlarged by the same magnification, and the enlarged image 1 and image 2 are compared, it is found that texture details of the photographed object in the enlarged image 2 are richer, and the boundaries of each part of the photographed object are also clearer.

The following describes in detail the whole process from the mobile phone switching to a telephoto photographing scenario, the processing of the original image collected by the camera, the preview and display of the processed image, to the photographing of a generated photo or video.

1. The mobile phone is switched to a telephoto photographing scenario

In some embodiments, the user can manually adjust the zoom ratio used when photographing with the mobile phone.

For example, as shown in FIG. 3(2), the user can adjust the zoom ratio used by the mobile phone by operating the zoom ratio indicator 303 in the photographing interface. For example, when the current mobile phone zoom ratio is "1×", the user can click the zoom ratio indicator 303 one or more times to change the zoom ratio used by the mobile phone to "5×", that is, the mobile phone displays the photographing interface shown in FIG. 4(1). The framing range of the image previewed in the finder frame 302 in the photographing interface shown in FIG. 4(1) is significantly smaller than the framing range in the finder frame 302 in FIG. 3(2), but the size of the photographed object (for example, a bird) previewed in the finder frame 302 is larger than that of the photographed object previewed in the finder frame 302. In some examples, the photographing interface shown in FIG. 4(1) can also continue to display the zoom ratio indicator 303. In this case, the current zoom ratio is displayed as "5×", so that the user can know the current zoom ratio.

For another example, as shown in FIG. 3(3), the user can reduce the zoom ratio of the mobile phone by using a two-finger (or three-finger) pinch gesture in the photographing interface, or an outward two-finger (or three-finger) sliding gesture (in the direction opposite to the direction of pinch) to increase the zoom ratio used by the mobile phone.

For another example, as shown in FIG. 3(4), the user can change the zoom ratio used by the mobile phone by dragging a zoom ruler 304 in the photographing interface.

For another example, the user can also change the zoom ratio of the mobile phone by switching the camera currently in use in the photographing interface or a photographing setting interface. For example, when the user chooses to switch to the telephoto camera, the phone automatically increases the zoom ratio.

For another example, the user can also change the zoom ratio of the mobile phone by selecting an option for a telephoto photographing scenario or an option for a remote photographing scenario or the like in the photographing interface or the photographing setting interface.

In some other embodiments, the mobile phone can also automatically recognize a specific scenario of the image captured by the camera, and automatically adjust the zoom ratio based on the recognized specific scenario. For example, if the mobile phone recognizes that the image captured by the camera is a scenery with a large field of view, such as the sea, mountains or woods, the mobile phone can automatically reduce the zoom ratio. For another example, if the mobile phone recognizes that the image captured by the camera is a distant object, such as a bird in the distance or an athlete on a sports field, the mobile phone can automatically increase the zoom ratio. This is not limited in this application.

When the zoom ratio of the mobile phone is adjusted to be greater than or equal to the preset magnification, the mobile phone enters the telephoto photographing scenario.

2. Image preview in a telephoto photographing scenario

Figure 4:
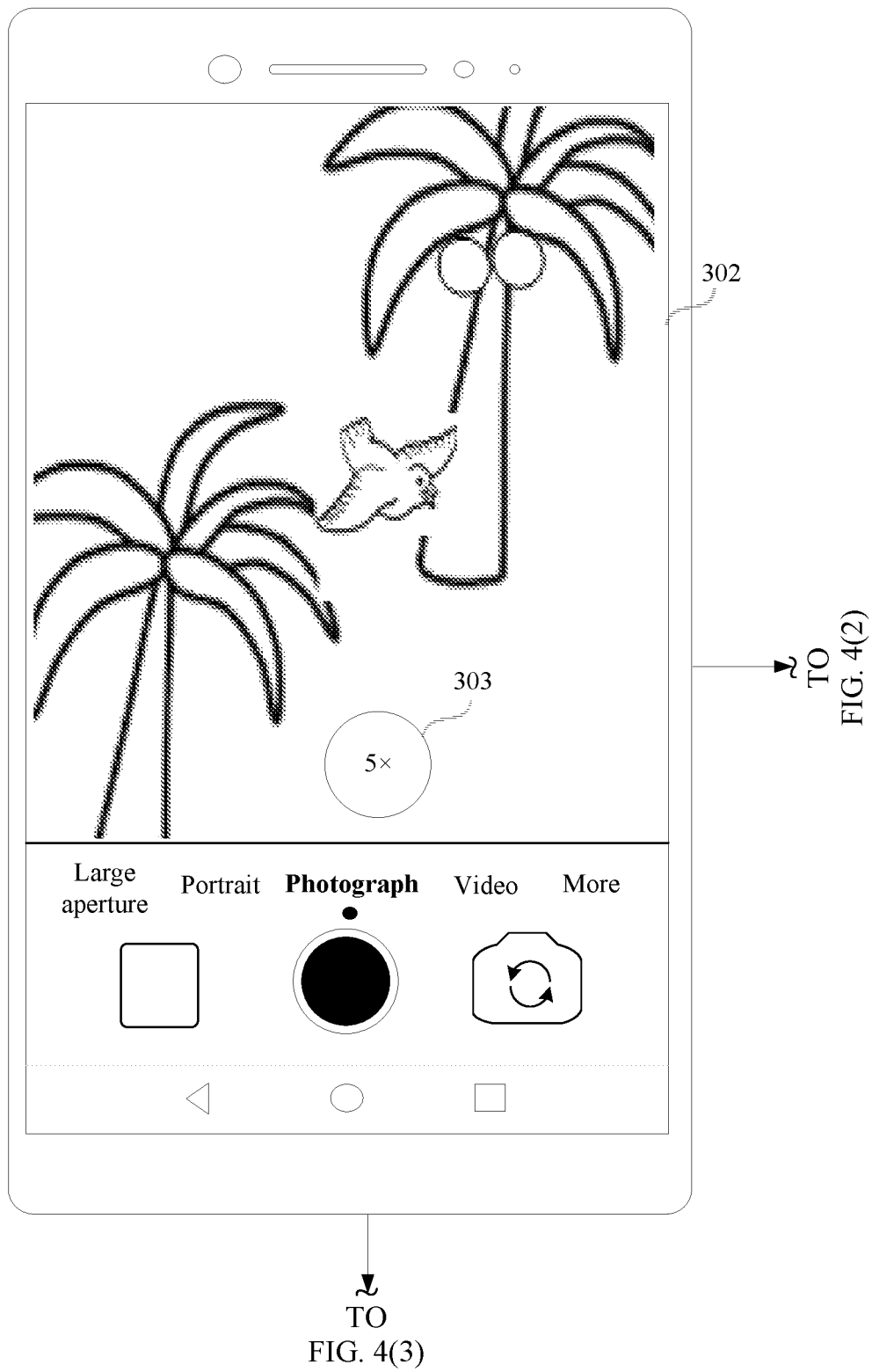
FIG. 4(1) to FIG. 4(4) are schematic diagrams of user interfaces of some other mobile terminals according to an embodiment of this application.
Figure 4:
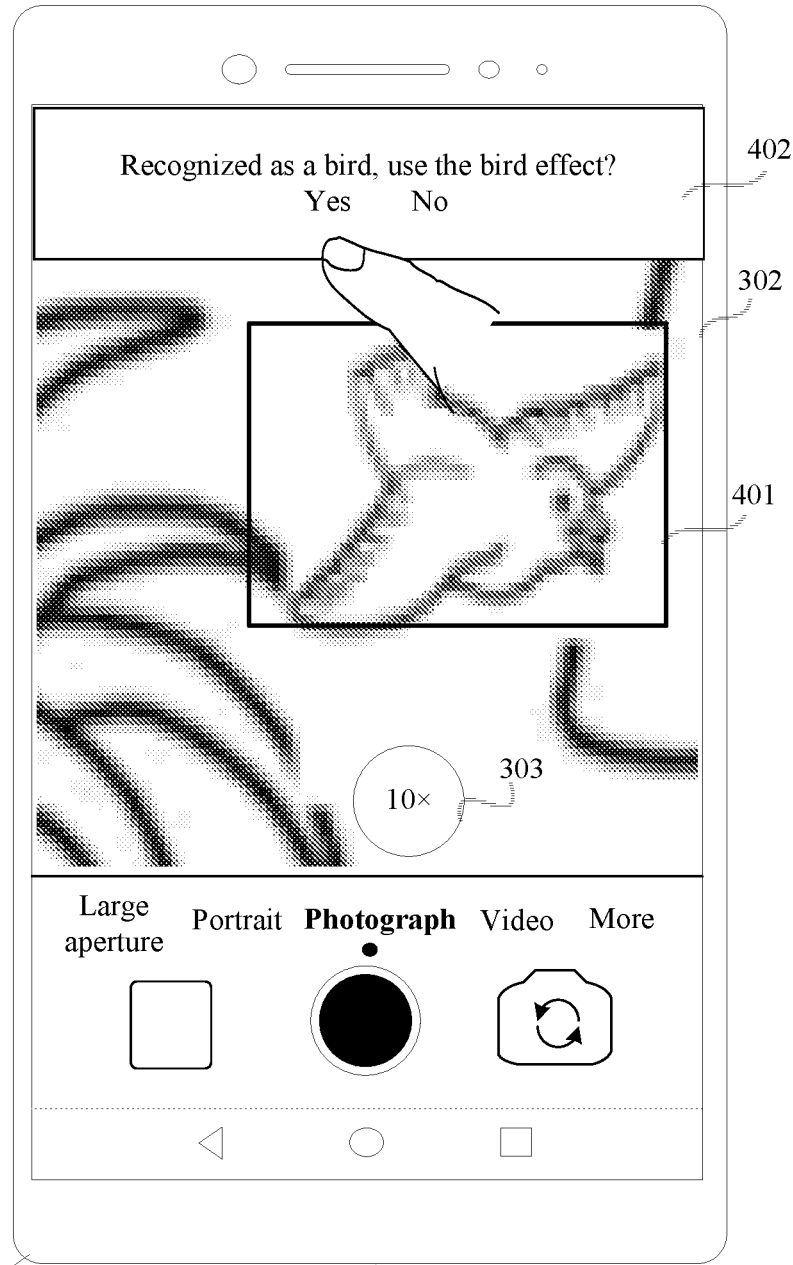
Figure 4:
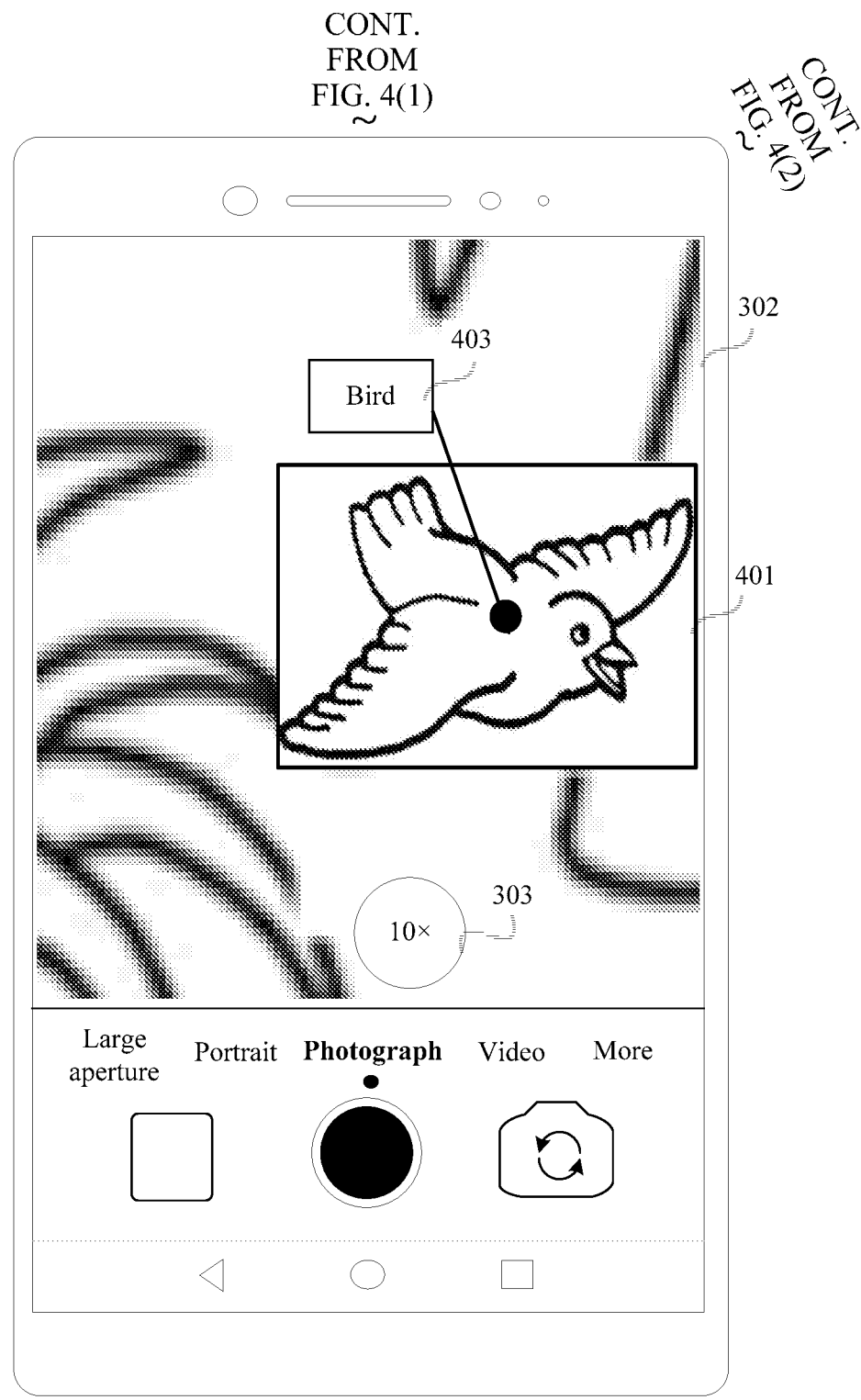
Figure 4:
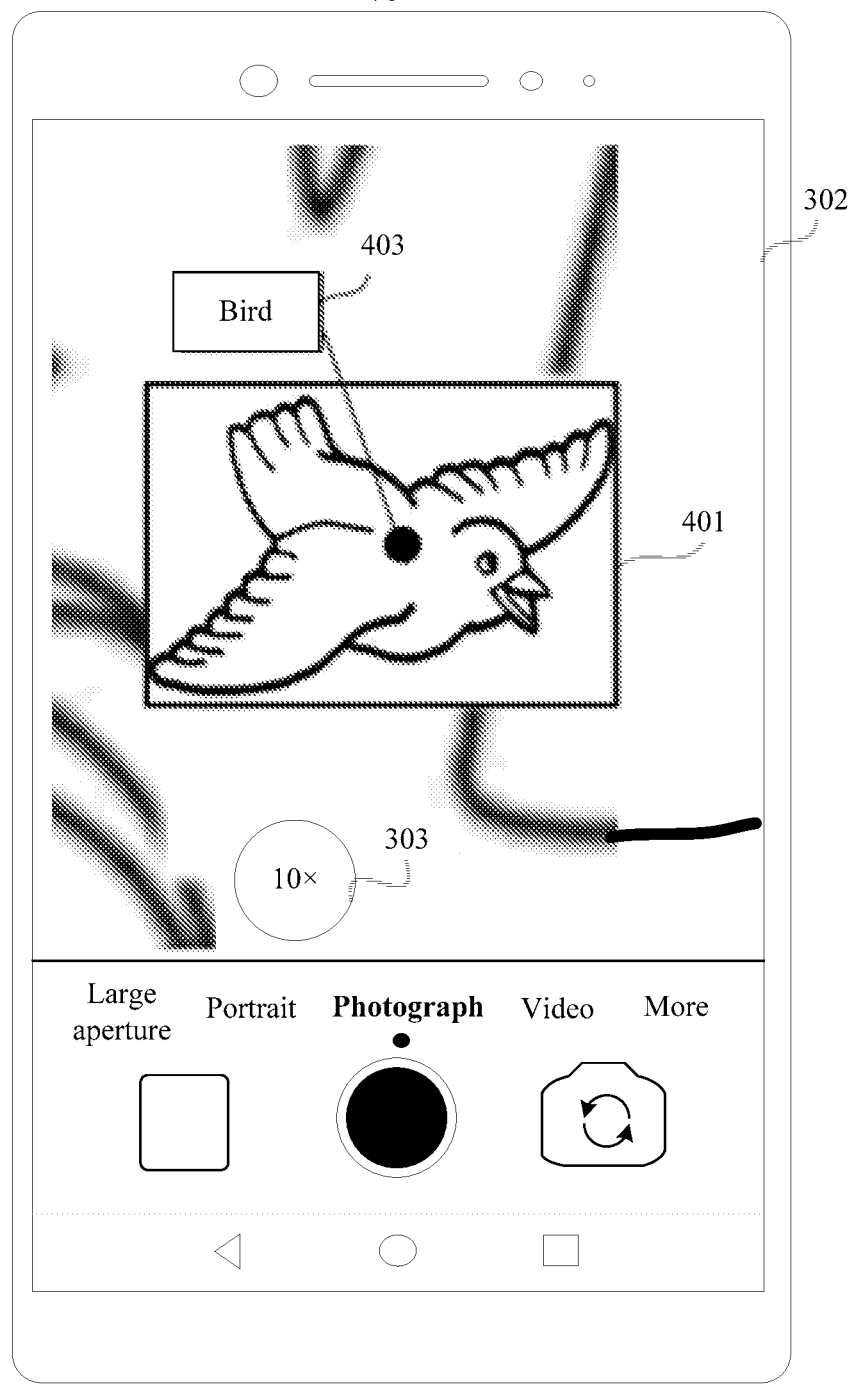

In some embodiments of this application, when the zoom ratio of the mobile phone is adjusted to be greater than or equal to the preset magnification, for example, "10×", the mobile phone displays the photographing interface shown in FIG. 4(2). In the photographing interface shown in FIG. 4(2), the finder frame 302 includes a marker box 401, which is configured to mark a photographed object recognized by the mobile phone. For example, the photographed object is a bird. It should be noted that the photographed object shown in the figure is in a moving state. The method according to this embodiment of this application is not limited to whether the photographed object is in a moving state or a static state. In some examples, the mobile phone may further display a prompt box 402, which is configured to recommend to the user an image processing mode corresponding to a category of the photographed object. For example, the recognized photographed object is a bird, and the user is asked whether to turn on the image processing mode corresponding to the bird (or called a bird mode or a bird effect). In response to the user choosing to turn on the corresponding image processing mode, the mobile phone performs corresponding image processing on the collected image and displays the photographing interface shown in FIG. 4(3). In some other examples, after the mobile phone recognizes the category and location of the photographed object, the mobile phone can also automatically use the image processing mode corresponding to the category of the photographed object for processing. That is, when the zoom ratio of the mobile phone is adjusted to be greater than or equal to the preset magnification, the mobile phone directly displays the photographing interface shown in FIG. 4(3).

In the photographing interface shown in FIG. 4(3), the image displayed in the finder frame 302 is an image having undergone corresponding image processing. It can be learned that a clearer photographed object recognized indicates higher sharpness. Optionally, the mobile phone may further display a label 403 corresponding to the photographed object recognized. Optionally, the mobile phone can further blur the background of the photographed object recognized, so that the processed image has an artistic sense, and the visual effect of the image is improved.

Certainly, in still some other examples, after the mobile phone chooses to use the image processing mode corresponding to the category of the photographed object by default, or the user manually turns on the image processing mode corresponding to the category of the photographed object, the user can also manually turn off the image processing mode corresponding to the category of the photographed object, or the mobile phone automatically turns off the image processing mode corresponding to the category of the photographed object when no corresponding image processing mode corresponds to the category of the photographed object recognized.

In a specific implementation, the ISP or another processor of the mobile phone performs image analysis on the image collected by the camera, recognizes from the image the photographed object that the user intends to photograph, and further recognizes the category and position of the photographed object. The category of the photographed object can be arbitrarily classified based on objects usually photographed by the user, which may be a first-level classification or a multi-level classification. For example, the category of the photographed object may include: humans, animals, or plants. The animal category can further include a second-level classification, such as dogs, cats, squirrels and birds.

Further, the bird category may further include a third-level classification, such as sparrows, magpies, seagulls, seabirds, pigeons and wild geese.

When the image collected by the camera includes a plurality of objects, an object with the largest area may be the photographed object by default, or an object located in the central area of the image is the photographed object, or an object selected by the user (for example, an object selected by a click operation) is the photographed object. Certainly, a plurality of objects may be selected as photographed objects by default. This is not limited in this embodiment of this application.

In some examples, the ISP or another processor of the mobile phone may use a target detection technology based on deep learning, such as regional-convolutional neural networks (regional-convolutional neural networks, R-CNN), fast regional-convolutional neural networks (fast R-CNN), faster regional-convolutional neural networks (faster R-CNN) or the like to recognize the category and position of the photographed object. Optionally, the category and position of the photographed object can be marked in the finder frame of the mobile phone, so that the user confirms whether the marked object is the intended photographed object and whether the mobile phone accurately recognizes the category and position of the photographed object. If it is confirmed that the object category and position automatically recognized by the mobile phone are correct, the corresponding image processing mode recommended by the mobile phone may be used. Otherwise, the user may choose not to use the image processing mode recommended by the mobile phone, or change the photographed object and the like, to prevent wrong image processing.

After the category and position of the photographed object are recognized, part of the image of the photographed object can be processed. For example, based on an image segmentation technology, a partial image corresponding to the photographed object can be obtained by segmenting the collected image, and then detail enhancement is performed on the photographed object obtained through segmentation.

It may be understood that the mobile phone can pre-train an AI model for detail enhancement on the photographed objects based on the category of the photographed object. Certainly, the mobile phone can alternatively directly obtain the trained AI model from a server. It should be noted that, when the AI model for detail enhancement on the photographed objects based on the category of the photographed object is trained, it is necessary to input a large quantity of training samples of the photographed object, including training samples of various categories. For example, training samples for magpies in birds include images of magpies of different breeds, images of magpies of the same breed with different sizes or colors, images of magpies of the same breed with different postures, and images of magpies of the same breed in different environments. Detail enhancement on photographed objects may include using the AI model for intelligent pixel filling and the like of blurred areas in the photographed objects to enhance image sharpness. The detail enhancement further includes: using the AI model for intelligent pixel filling and the like of missing parts of the photographed objects to repair the missing parts of the photographed objects and the like. The detail enhancement may further include: improving overall sharpness of a partial image of the photographed object and the like.

In some other examples, before the mobile phone performs detail enhancement on the photographed object, the mobile phone can further perform automatic focus (automatic focus, AF) and automatic exposure (automatic exposure, AE) based on the photographed object recognized to highlight the photographed object and improve quality of the image. It may be noted that in the prior art, focusing and exposure are usually performed based on a fixed position, or based on a position selected by the user (for example, a touch position of a click operation). However, in this embodiment of this application, focusing and exposure are performed based on the position of the photographed object automatically recognized by the mobile phone, so as to improve overall sharpness of the photographed object. It may be noted that in the prior art, the size of a focus frame is fixed, and is usually set by default in the mobile phone. However, in this embodiment of this application, during the auto-focusing process based on the photographed object, the size of the focus frame is automatically adjusted based on the size of the photographed object recognized by the mobile phone. In some examples, the focus frame may be the same as the marker box 401 shown in FIG. 4(2).

Optionally, because the method according to this embodiment of this application is applied to a telephoto photographing scenario, the closest search distance during auto-focusing of the mobile phone may be set to, for example, 10 meters. That is, when the mobile phone is auto-focused, the search distance range is 10 meters from the mobile phone to infinity. In other words, the mobile phone does not need to search in the range of 10 meters to a macro distance from the mobile phone. Therefore, the time for auto-focusing of the mobile phone can be reduced, and efficiency of image processing is improved.

In some other examples, before the mobile phone performs detail enhancement on the photographed object, the mobile phone can further collect a plurality of (for example, 6) images containing the photographed object based on parameters determined during automatic focus and automatic exposure. The plurality of images containing the photographed object are synthesized into one high-definition image by using a super resolution (super resolution) technology. Then detail enhancement of the photographed object is performed on the synthesized high-definition image. Therefore, the overall sharpness of the image is further improved.

In still some other examples, a background extraction algorithm may alternatively be used to recognize a background of the photographed object based on the photographed object recognized, and blur the background. This highlights the photographed object better and improves overall artistic beauty of the image. The background extraction algorithm includes, but is not limited to, an inter-frame difference method, a background difference method and an environment algorithm (ViBe algorithm and ViBe+ algorithm). This is not limited in this embodiment of this application. To blur the background, a fuzzy algorithm may be used to process the image of the area in which the background is located, and obtain the background image with a blurred effect. The fuzzy algorithm includes any one or random several of Gaussian filtering (Gaussian filtering), circular filtering, guided filtering (guided filtering) and domain filtering (domain filtering).

In some other embodiments of this application, the mobile phone can further adjust the position of the photographed object recognized. In a specific implementation, based on the position of the recognized photographed object in the image, the background of the photographed object in the image can be cut or filled, so that the photographed object is located at a central position of the image. Alternatively, the photographed object may be located at another position of the image, for example, a position that is on the left or right of the central position by a certain distance. This is not limited in this embodiment of this application.

For example, in the photographing interface shown in FIG. 4(4), the photographed object in the image displayed in the finder frame 302 is located at the central area of the finder frame. This can highlight the photographed object and further improve the visual effect of the image.

Figure 5:
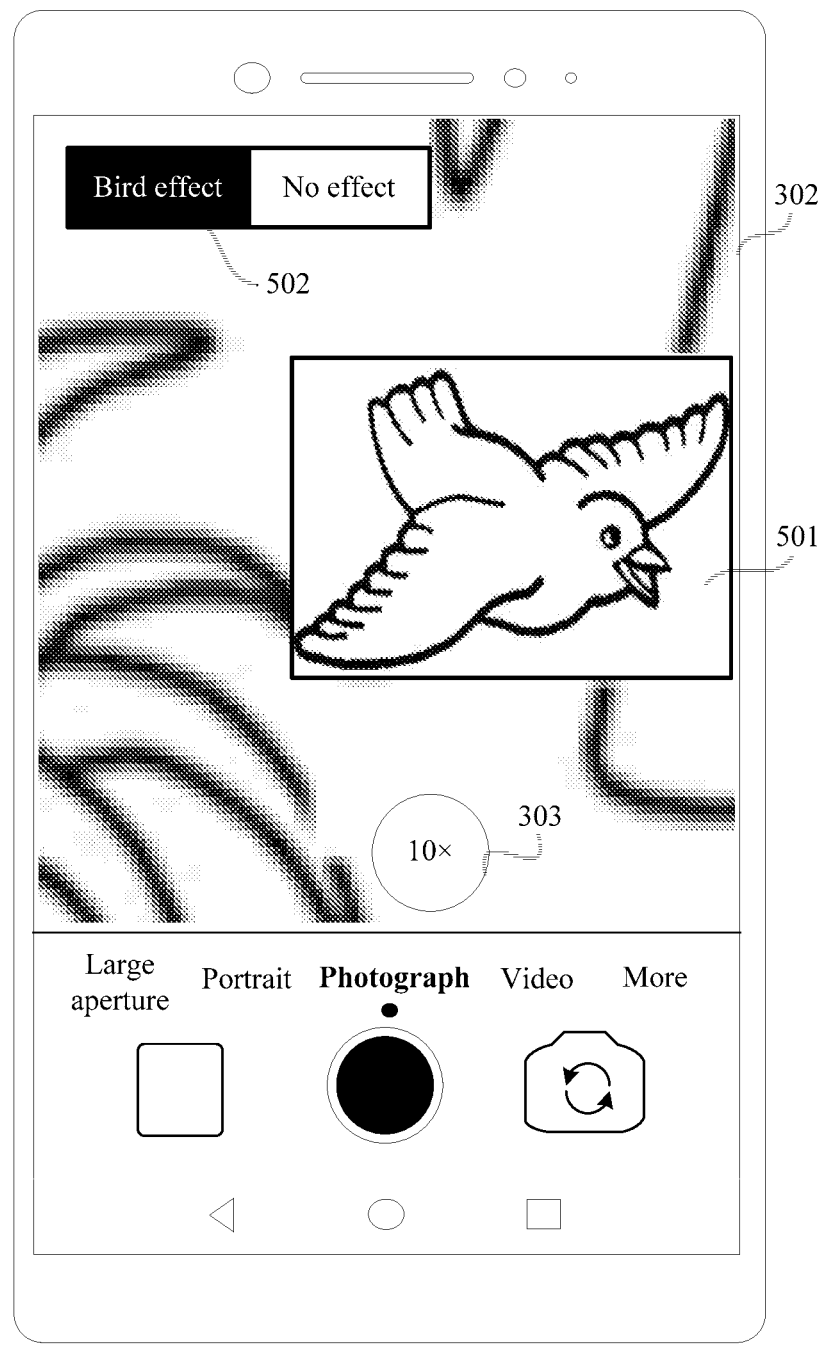
FIG. 5(1) to FIG. 5(4) are schematic diagrams of user interfaces of still some other mobile terminals according to an embodiment of this application.
Figure 5:
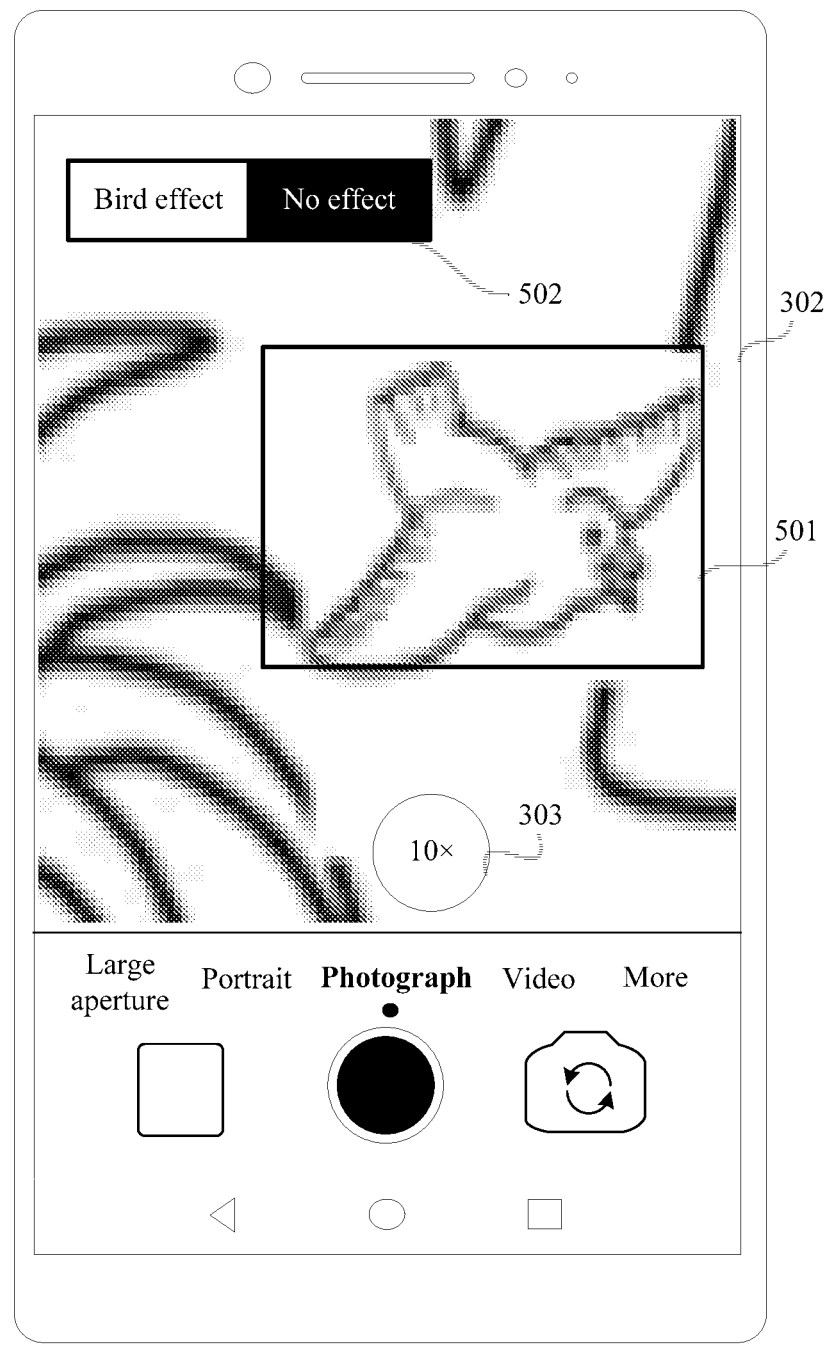
Figure 5:
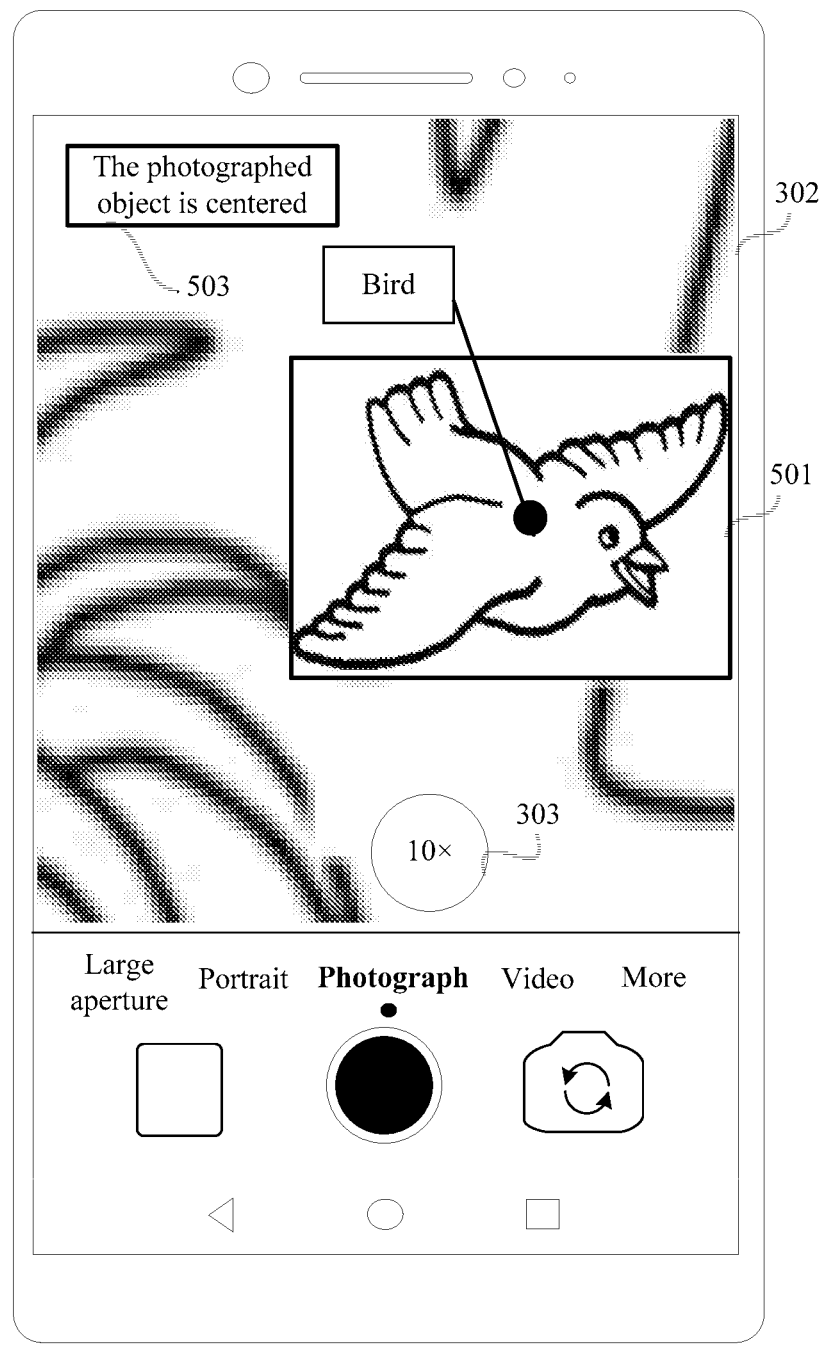
Figure 5:
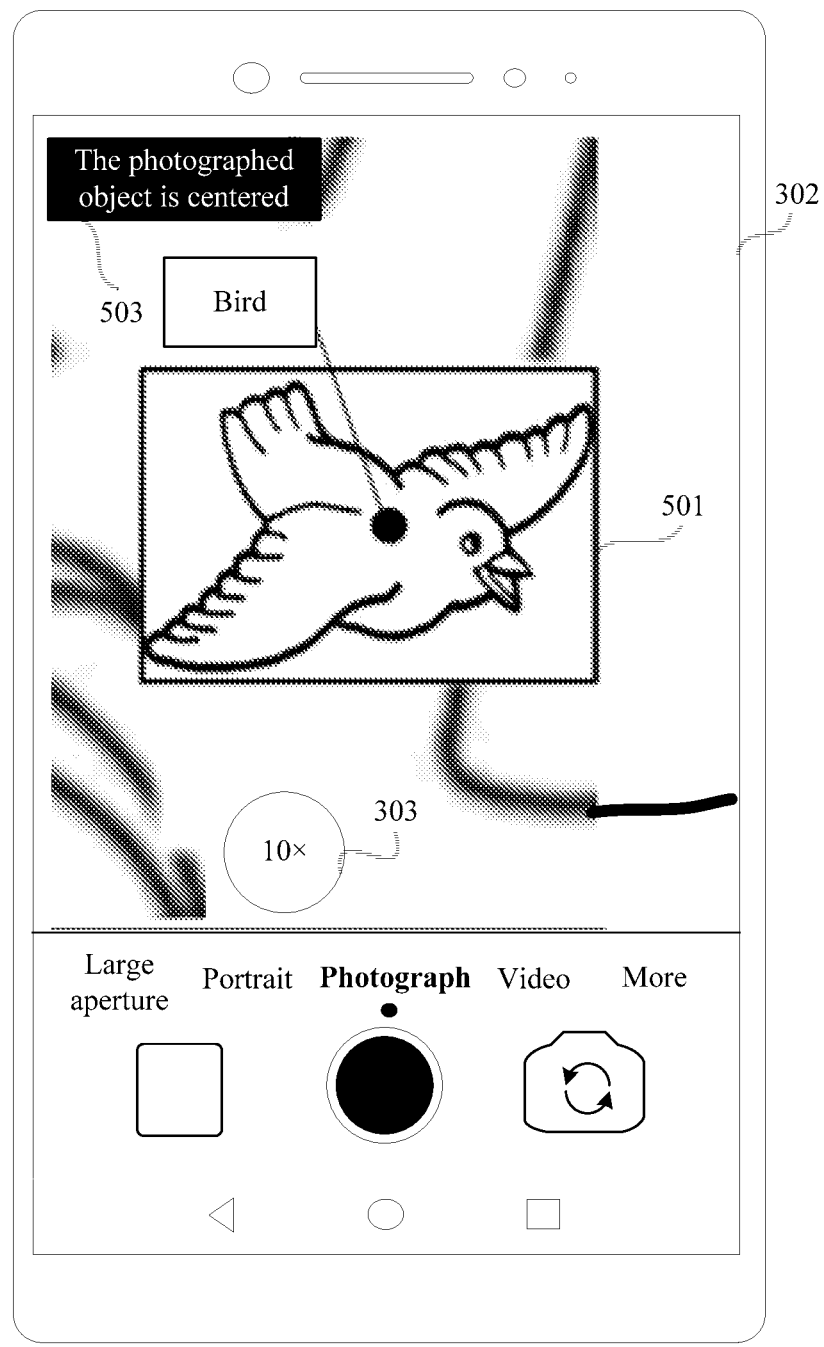

In still some other embodiments of this application, when previewing, the user may further choose to switch between the image processing effect corresponding to the category of the photographed object and no processing (that is, no effect). For example, in the interface shown in FIG. 5(1), the mobile phone can further display options 502. If the user selects a "bird effect" option in the options 502, the image displayed in the finder frame 302 is an image processed in a bird effect mode. If the user selects a "no effect" option in the options 502, in the interface displayed in FIG. 5(2), the image displayed in the finder frame 302 is an image that has not been processed in the bird effect mode. By comparison, it can be learned that in the interface shown in FIG. 5(1), the sharpness of the image (that is, the photographed object) in the marker box 501 in the finder frame 302 is higher than that of the image in the marker box 501 in FIG. 5(2). In another example, in the interface shown in FIG. 5(1), the sharpness of the image (that is, the background) outside the marker box 501 in the finder frame 302 is lower than that of the image outside the marker box 501 in FIG. 5(2). In still another example, the position of the marker box 501 in the finder frame 302 in the interface shown in FIG. 5(1) is also different from the position of the marker box 501 in the interface shown in FIG. 5(2). It can be learned that the user can perform switching between the effect before image processing and the effect after image processing through the options 502, so that the user can compare and choose a preferred method for photographing to improve user experience.

In still some other embodiments of this application, after the user chooses to use the image processing corresponding to the category of the photographed object, the user can further choose whether to adjust the position of the photographed object. For example, in the interface shown in FIG. 5(3), an option control 503 may be further displayed. When the user does not select the option control 503, the mobile phone retains the original position of the photographed object. If the user selects the option control 503, the mobile phone displays the interface shown in FIG. 5(4), and the marker box 501 is located in the central area of the finder frame 302. That is, the mobile phone adjusts the position of the photographed object to the central area of the image.

In still some other embodiments, the user can also manually turn on the image processing function based on the category of the photographed object according to the embodiments of this application. For example, in the interface shown in FIG. 6(1), in response to detecting that the user operates a setting control 601, the mobile phone displays a photographing setting interface 602 shown in FIG. 6(2). A control 603 is displayed in the photographing setting interface 602, and is configured to turn on the image processing function based on the category of the photographed object. That is, when the user turns on this function, and the mobile phone in a telephoto photographing scenario automatically adopts the method according to this embodiment of this application to process the collected image. Certainly, the user can also use this control 603 to manually turn off the image processing function based on the category of the photographed object in the telephoto scenario.

Figure 6:
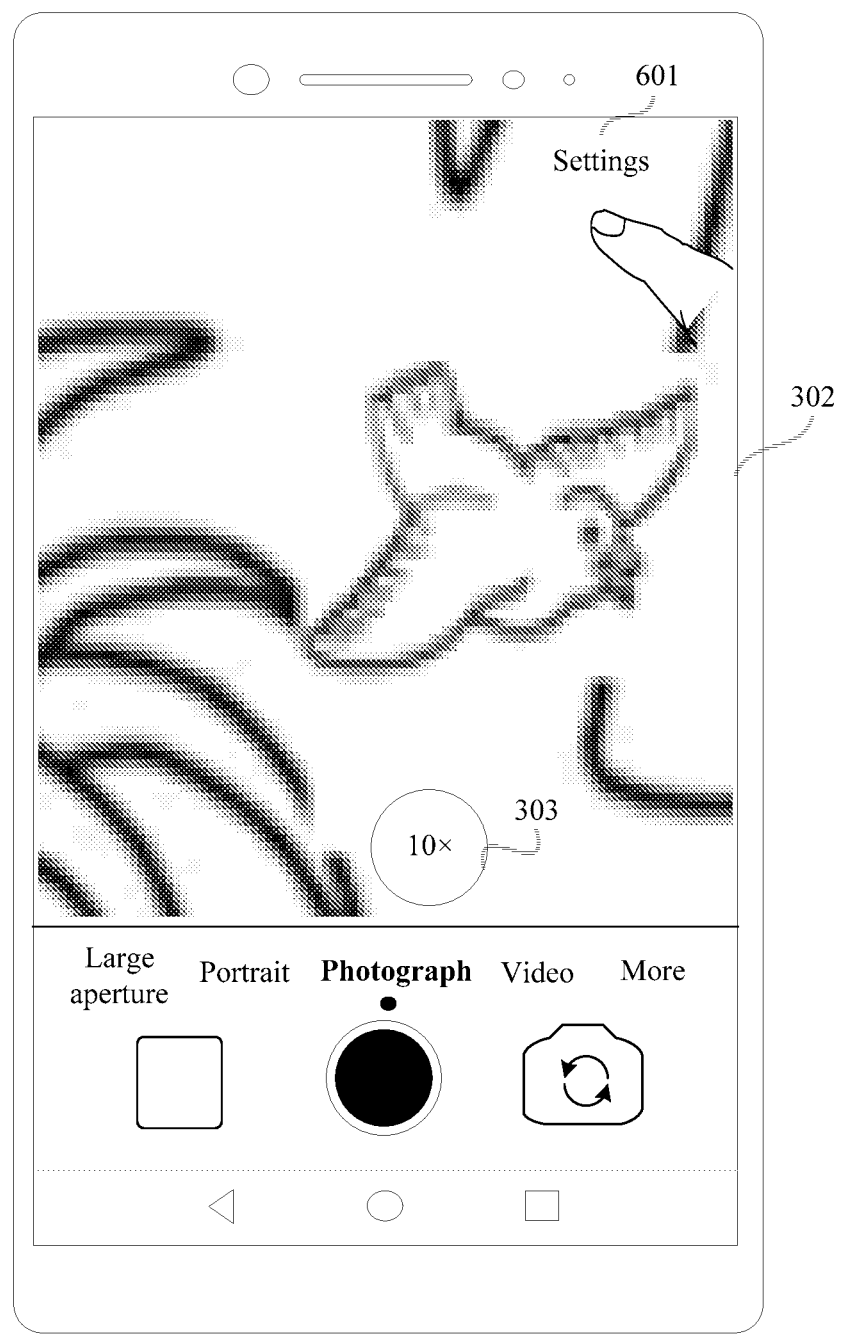
FIG. 6(1) to FIG. 6(4) are schematic diagrams schematic diagram of user interfaces of still some other mobile terminals according to an embodiment of this application.
Figure 6:
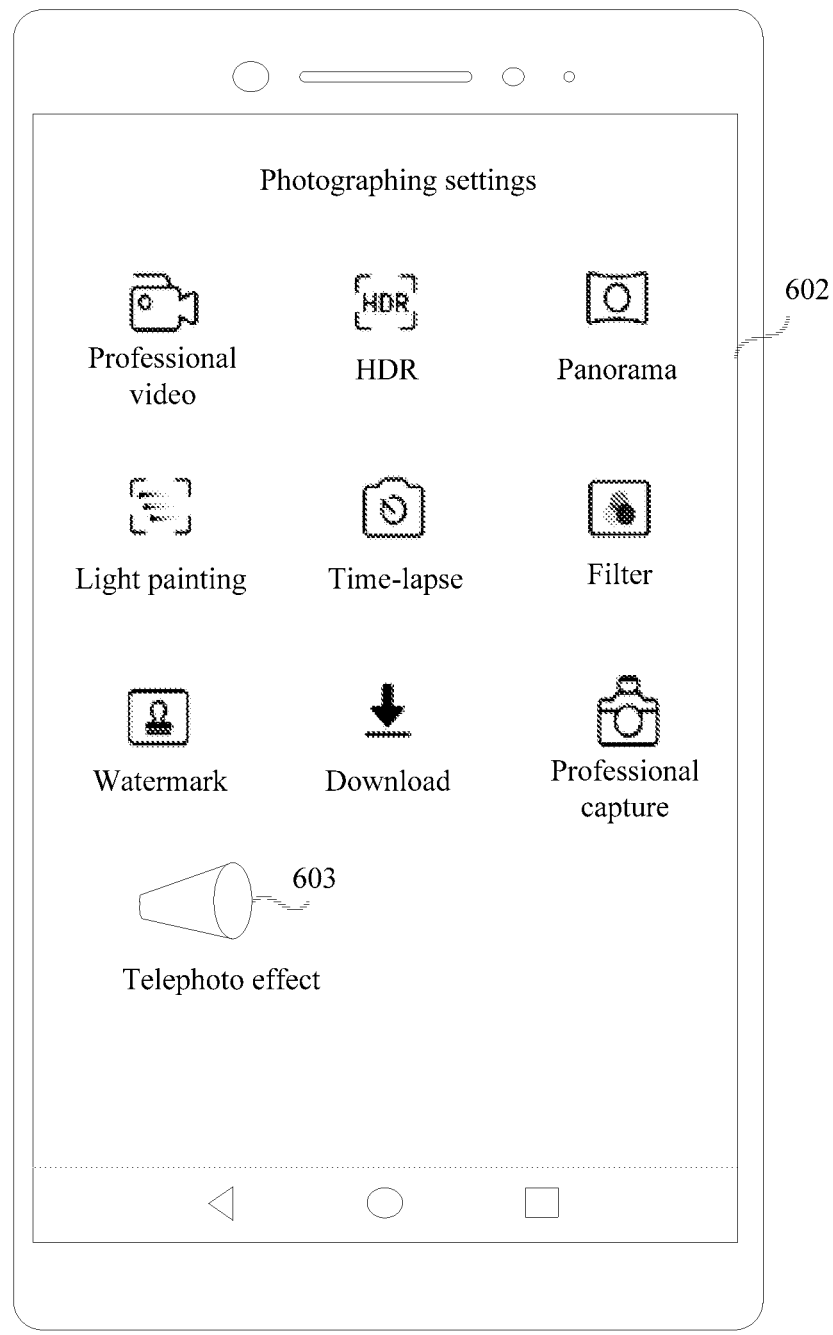
Figure 6:
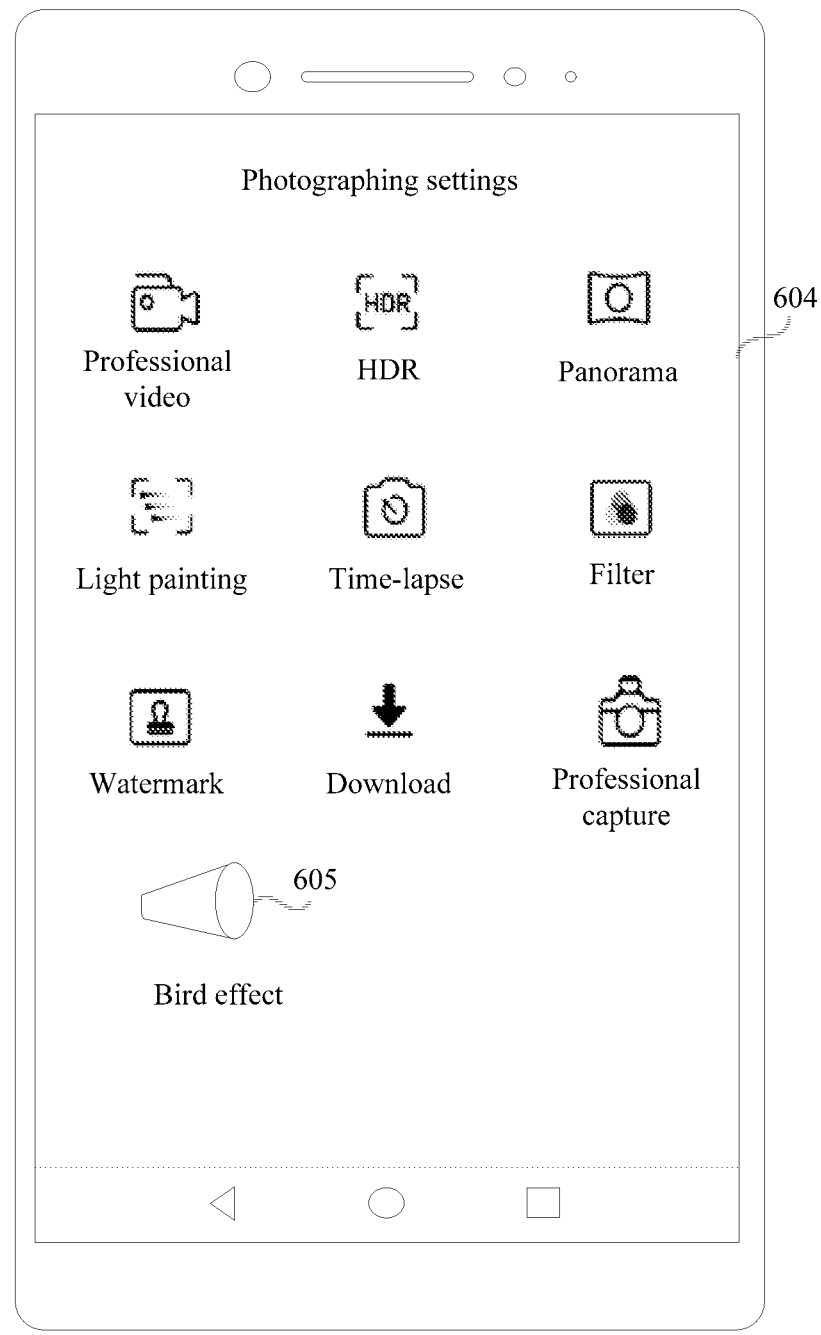
Figure 6:
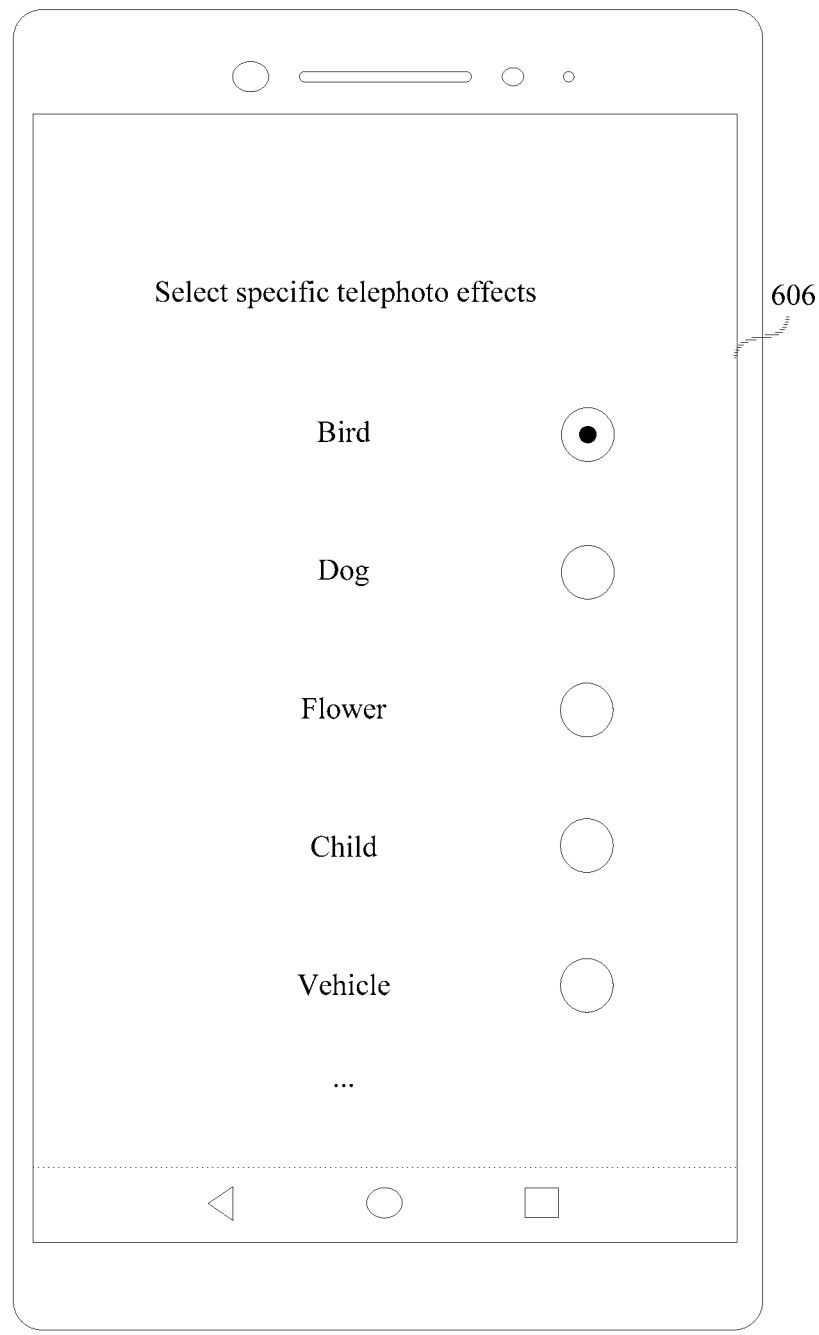

Optionally, some commonly used category controls 605 may be displayed in the photographing setting interface 604 shown in FIG. 6(3). The user can turn on the image processing function of the corresponding category by using the category controls 605. That is, when the user turns on the image processing function corresponding to a certain category, the mobile phone in a telephoto photographing scenario automatically adopts the corresponding image processing method to process the collected image. For example, if the user chooses to turn on the bird effect function, the mobile phone processes the collected image in the image processing mode corresponding to birds.

Alternatively, options of a plurality of categories are displayed in a setting interface 606 in FIG. 6(4). The user can select the corresponding category based on an actual scenario, so that the mobile phone can process the collected image in the corresponding image processing mode.

It can be learned that when the user selects a processing mode of a specific category, the mobile phone can directly use the corresponding image processing mode without automatically recognizing the category of the photographed object, which can accelerate the image processing effect. Alternatively, after the mobile phone makes a mistake in recognizing the category of the photographed object, the user can also select the image processing mode corresponding to the correct category by using this manual method.

3. Photographing or video shooting

The user can determine the photographing time based on the preview in the finder frame. After detecting the photographing operation performed by the user, the mobile phone performs corresponding image processing based on the image collected at the current time to obtain the processed image. For the method of image processing, reference may be made to the image processing during preview. Details are not described herein again.

The mobile phone can save an image having undergone image processing based on the category of the photographed object in a photo album. In some examples, the mobile phone can further save an image in the photo album without image processing based on the category of the photographed object.

When the mobile phone is in other modes, such as continuous photographing, photographing of slow motion and video recording, the method according to this application can also be used to perform corresponding processing on the collected image. For example, when the mobile phone performs continuous photographing, the camera collects a plurality of images, and the mobile phone can perform image processing based on the photographed object on each image to obtain a plurality of processed images. For another example, when the mobile phone photographs slow motion or records a video, both the slow motion and the video are composed of image frames. Image processing based on the photographed object is performed on each of the image frames, and then the processed images constitute new slow motion and a new video.

When an image saved in a mobile phone or an image received from another device is an image in a telephoto photographing scenario, the method according to this application can also be used to perform image processing based on the photographed object on the image.

Figure 7:
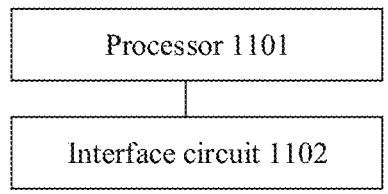
FIG. 7 is a schematic structural diagram of a chip system according to an embodiment of this application.

An embodiment of this application further provides a chip system. As shown in FIG. 7, the chip system includes at least one processor 1101 and at least one interface circuit 1102. The processor 1101 and the interface circuit 1102 may be interconnected by a line. For example, the interface circuit 1102 may be configured to receive a signal from another apparatus (such as a memory of the mobile terminal 100). For another example, the interface circuit 1102 may be configured to send a signal to another apparatus (for example, the processor 1101). For example, the interface circuit 1102 can read an instruction stored in the memory, and send the instruction to the processor 1101. When the instruction is executed by the processor 1101, the mobile terminal is enabled to perform various steps performed by the mobile terminal 100 (for example, a mobile phone) in the foregoing embodiments. Certainly, the chip system may further include other discrete devices, which are not specifically limited herein in the embodiments of this application.

An embodiment of this application further provides an apparatus. The apparatus is included in a mobile terminal and has a function of implementing behavior of the mobile terminal in any method in the foregoing embodiments. This function may be implemented by hardware, or by hardware executing corresponding software. The hardware or software includes at least one module or unit corresponding to the foregoing function. for example, a detection module or unit, a determining module or unit.

An embodiment of this application further provides a computer readable storage medium, including a computer instruction, where when the computer instruction is run on a mobile terminal, the mobile terminal is enabled to perform any method in the foregoing embodiments.

An embodiment of this application further provides a computer program product. When the computer program product runs on a computer, the computer is enabled to perform any method in the foregoing embodiments.

It may be understood that, to implement the foregoing functions, the foregoing terminal and the like include corresponding hardware structures and/or software modules for performing the functions. A person skilled in the art should easily realize that, with reference to the units and algorithm steps described in the embodiments disclosed in this specification, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the foregoing terminal and the like may be divided into functional modules based on the foregoing method examples. For example, each functional module may be obtained through division for a corresponding function, or two or more functions may be integrated into one processing module. The integrated modules may be implemented in a form of hardware, or may be implemented in a form of a software function module. It should be noted that module division in the embodiments of the present invention is an example, and is merely logical function division. In actual implementation, there may be another division manner.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an inner structure of an apparatus is divided into different functional modules to implement all or some of the functions described above. For the specific working processes of the system, apparatus and units described above, reference may be made to the corresponding processes in the above-mentioned method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer readable storage medium. Based on such understanding, the technical solution of this embodiment of this application which is essential or a part contributing to the prior art or all or a part of the technical solution may be embodied in the form of a software product, and the computer software product is stored in a storage medium and includes several instructions for enabling a computer device (which may be a personal computer, a server or a network device) for a processor to perform all or some steps of the method according to each embodiment of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

The invention claimed is:

1. A photographing method in a telephoto scenario, wherein the method is applied to a mobile terminal comprising a camera, and the photographing method comprises:
   starting the camera by the mobile terminal, and displaying a finder frame by the mobile terminal, wherein the finder frame is used to display a first preview picture, and a zoom ratio of the camera corresponding to the first preview picture is a first magnification;
   receiving a first operation input by a user to increase the zoom ratio of the camera;
   displaying a second preview picture by the finder frame in response to the first operation, wherein a zoom ratio of the camera corresponding to the second preview picture is a second magnification, and the second magnification is greater than the first magnification;
   adjusting the second preview picture, so that a target photographed object is located in a central area of the finder frame; and
   if the second magnification is greater than or equal to a preset magnification, before the mobile terminal displays the second preview picture, performing, by the mobile terminal, first image processing on an image collected by the camera to generate the second preview picture;
   wherein the first image processing comprises:
   recognizing the target photographed object and a background of the target photographed object based on the image collected by the camera; and
   improving image sharpness of an area in which the target photographed object is located, and adding a blurring effect to the image of the area in which the background of the target photographed object is located.

2. The method according to claim 1, wherein the method further comprises:
displaying, by the mobile terminal, a marker box on the second preview picture to mark the area in which the target photographed object is located.

3. The method according to claim 1, wherein the method further comprises:
displaying, by the mobile terminal, prompt information on the second preview picture to recommend the first image processing corresponding to the target photographed object.

4. The method according to claim 3, wherein the performing, by the mobile terminal, first image processing on an image collected by the camera comprises:
receiving, by the mobile terminal, a second operation input by the user to select the first image processing; and
in response to the second operation, performing, by the mobile terminal, the first image processing on the image collected by the camera.

5. The method according to claim 1, wherein after the mobile terminal displays the second preview picture, the method further comprises:
receiving a third operation input by the user, wherein the third operation is used to instruct the mobile terminal to turn off the first image processing function corresponding to the target photographed object; and
in response to the third operation, determining, by the mobile terminal, that no first image processing is performed on the image collected by the camera.

6. The method according to claim 1, wherein in the first image processing, the improving image sharpness of an area in which the target photographed object is located specifically comprises:
recognizing a category of the target photographed object, and obtaining a first image of the target photographed object by segmenting the image collected by the camera; and
inputting the first image into a neural network model corresponding to the category of the target photographed object, and outputting a second image of the target photographed object, wherein the sharpness of the second image is greater than that of the first image.

7. The method according to claim 6, wherein the neural network model corresponding to the category of the target photographed object is trained based on images of a plurality of photographed objects under the category of the target photographed object.

8. The method according to claim 1, wherein in the first image processing, the recognizing a background of the target photographed object specifically comprises:
recognizing, by using a background extraction algorithm, the background of the target photographed object from the image collected by the camera, wherein the background extraction algorithm comprises any one or random several of an inter-frame difference method, a background difference method and an environment algorithm.

9. The method according to claim 1, wherein the first image processing further comprises:
automatically focusing based on the target photographed object when the camera collects an image containing the target photographed object.

10. The method according to claim 1, wherein the first image processing further comprises:
controlling the camera to continuously collect N images containing the target photographed object, and using a super resolution technology to synthesize the N images containing the target photographed object into a third image; and
improving image sharpness of an area in which the target photographed object is located based on the third image, and adding a blurring effect to the image of the area in which the background of the target photographed object is located.

11. The method according to claim 1, wherein in the first image processing, the adding a blurring effect to the image of the area in which the background of the target photographed object is located specifically comprises:
using a fuzzy algorithm to process the image of the area in which the background of the target photographed object is located, wherein the fuzzy algorithm comprises any one or random several of Gaussian filtering, circular filtering, guided filtering and domain filtering.

12. A mobile terminal, comprising: a processor, a memory and a touch screen, wherein the memory and the touch screen are coupled to the processor, the memory is configured to store computer program code, the computer program code comprises a computer instruction, and when the processor reads the computer instruction from the memory, the mobile terminal is enabled to perform the photographing method in a telephoto scenario according to claim 1.

13. The mobile terminal according to claim 12, wherein the photographing method further comprises:
displaying, by the mobile terminal, a marker box on the second preview picture to mark the area in which the target photographed object is located.

14. The mobile terminal according to claim 12, wherein the photographing method further comprises:
displaying, by the mobile terminal, prompt information on the second preview picture to recommend the first image processing corresponding to the target photographed object.

15. The mobile terminal according to claim 14, wherein the performing, by the mobile terminal, first image processing on an image collected by the camera comprises:
receiving, by the mobile terminal, a second operation input by the user to select the first image processing; and
in response to the second operation, performing, by the mobile terminal, the first image processing on the image collected by the camera.

16. A non-transitory computer readable storage medium, comprising a computer instruction, wherein when the computer instruction is run on a terminal, the terminal is enabled to perform the photographing method in a telephoto scenario according to claim 1.

17. The non-transitory computer readable storage medium according to claim 16, wherein the photographing method further comprises:
displaying, by the terminal, a marker box on the second preview picture to mark the area in which the target photographed object is located.

18. The non-transitory computer readable storage medium according to claim 16, wherein the photographing method further comprises:
displaying, by the terminal, prompt information on the second preview picture to recommend the first image processing corresponding to the target photographed object.

19. The non-transitory computer readable storage medium according to claim 18, wherein the performing, by the terminal, first image processing on an image collected by the camera comprises:
- receiving, by the terminal, a second operation input by the user to select the first image processing; and
- in response to the second operation, performing, by the terminal, the first image processing on the image collected by the camera.

* * * * *